(12) United States Patent
Campero et al.

(10) Patent No.: US 8,497,762 B2
(45) Date of Patent: Jul. 30, 2013

(54) NETWORK CONTROL

(75) Inventors: Richard John Campero, San Clemente, CA (US); Paul Brent Rasband, Frederick, MD (US); Steven James Raynesford, Lake Forest, CA (US); Steve Edward Trivelpiece, Irvine, CA (US); Tim A. Von Kaenel, Cote de Caza, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 2051 days.

(21) Appl. No.: 11/370,530

(22) Filed: Mar. 7, 2006

(65) Prior Publication Data

US 2007/0211689 A1 Sep. 13, 2007

(51) Int. Cl.
*H04Q 9/00* (2006.01)
*H04L 29/04* (2006.01)

(52) U.S. Cl.
USPC ........................................... 340/10.1; 370/351

(58) Field of Classification Search
USPC ........................................... 340/10.1; 370/351
See application file for complete search history.

(56) References Cited

U.S. PATENT DOCUMENTS

| | | | |
|---|---|---|---|
| 4,044,357 A | | 8/1977 | Goldie |
| 7,764,191 B2 * | | 7/2010 | Hall et al. .................. 340/825.69 |
| 2003/0174099 A1 * | | 9/2003 | Bauer et al. .................... 343/893 |
| 2004/0056091 A1 * | | 3/2004 | Overhultz et al. ............. 235/382 |
| 2004/0127247 A1 * | | 7/2004 | Reece et al. ................ 455/550.1 |
| 2005/0025069 A1 * | | 2/2005 | Aysan ............................ 370/254 |
| 2005/0054293 A1 | | 3/2005 | Bann |
| 2005/0157699 A1 | | 7/2005 | Sakai |
| 2005/0248454 A1 | | 11/2005 | Hanson et al. |
| 2006/0025897 A1 | | 2/2006 | Shostak et al. |
| 2006/0033607 A1 * | | 2/2006 | Bellantoni .................... 340/10.1 |
| 2007/0053309 A1 | | 3/2007 | Poojary et al. |
| 2007/0206705 A1 | | 9/2007 | Stewart |
| 2007/0211689 A1 | | 9/2007 | Campero et al. |

FOREIGN PATENT DOCUMENTS

| | | |
|---|---|---|
| JP | H11-136735 | 5/1999 |
| JP | 2005519491 | 6/2005 |
| WO | 03/061060 | 7/2003 |

OTHER PUBLICATIONS

Wikipedia, "RFID", [online], [retrieved on Feb. 12, 2006], retrieved from the Internet at <URL: http://en.wikipedia.org/wiki/RFID>.
Search Report issued in corresponding PCT application No. PCT/US2007/05843.
Search Report issued in corresponding PCT application No. PCT/US2008/88048 on Feb. 13, 2008.

* cited by examiner

*Primary Examiner* — Brian Zimmerman
*Assistant Examiner* — Cal Eustaquio
(74) *Attorney, Agent, or Firm* — Kacvinsky Daisak PLLC

(57) ABSTRACT

In one embodiment, a network control module permits any or all of power signals, traffic signals and controller command signals to be carried on as few as one wire or cable to a first port of the network control module. In another aspect, a "peripheral array" includes a network control module (in any one of a number of different possible embodiments), with one or more peripheral devices, such as antennas, attached to or coupled with the network control module outputs. In one embodiment, RFID "smart shelving" may be fabricated in sections, with several (for example, 4, 8 or 16) antennas in each section, and as few as one cable coupling adjacent sections. Additional embodiments are described and claimed.

84 Claims, 15 Drawing Sheets

NETWORK CONTROL

BACKGROUND

Dense antenna networks such as those found in RFID-enabled (Radio Frequency Identification-enabled) shelving, bins, cabinets, product displays, or rack systems are often characterized by hundreds or even thousands of individual RF (Radio Frequency) antennas. These antennas are typically connected directly or indirectly (through switches or switch networks) to RF transmitter-receivers often referred to as "RFID readers" which modulate an RF carrier wave to communicate with RFID transponders in the environment located around the antennas, and which further may demodulate responsive signals received from the transponders. In order to reduce the number of readers servicing a large antenna network, it is known to use complex switching schemes which are capable of connecting one of the many antennas to the reader.

FIG. 1 is a schematic illustrating a typical prior art approach. Individual RFID antennas 100 are connected to a central common RF communications cable 105 using simple switches or relays 110. Over the common cable, the antennas are driven from an RFID reader 120 which generates outgoing and interprets incoming RF signals, referred to herein as "traffic signals". The reader is controlled by commands received from a computer 130. To initiate communication with transponders 140 within the read range of a particular antenna, the computer 130 selects an antenna and sends the identity of the selected antenna to the switch controller 150, which in turn activates the selected antenna using a control line 115 coupled between the switch controller 150 and the antenna's associated relay 110. The other antennas are deactivated over their respective control lines. The computer 130 then instructs the reader 120 to collect the required information, and the results from the reader 120 are returned to the computer 130 and associated with the active antenna.

DETAILED DESCRIPTION

In the following description, reference is made to the accompanying drawings which form a part hereof and which illustrate several embodiments. It is understood that other embodiments may be utilized and structural and operational changes may be made without departing from the scope of the descriptions provided.

Figure 1:
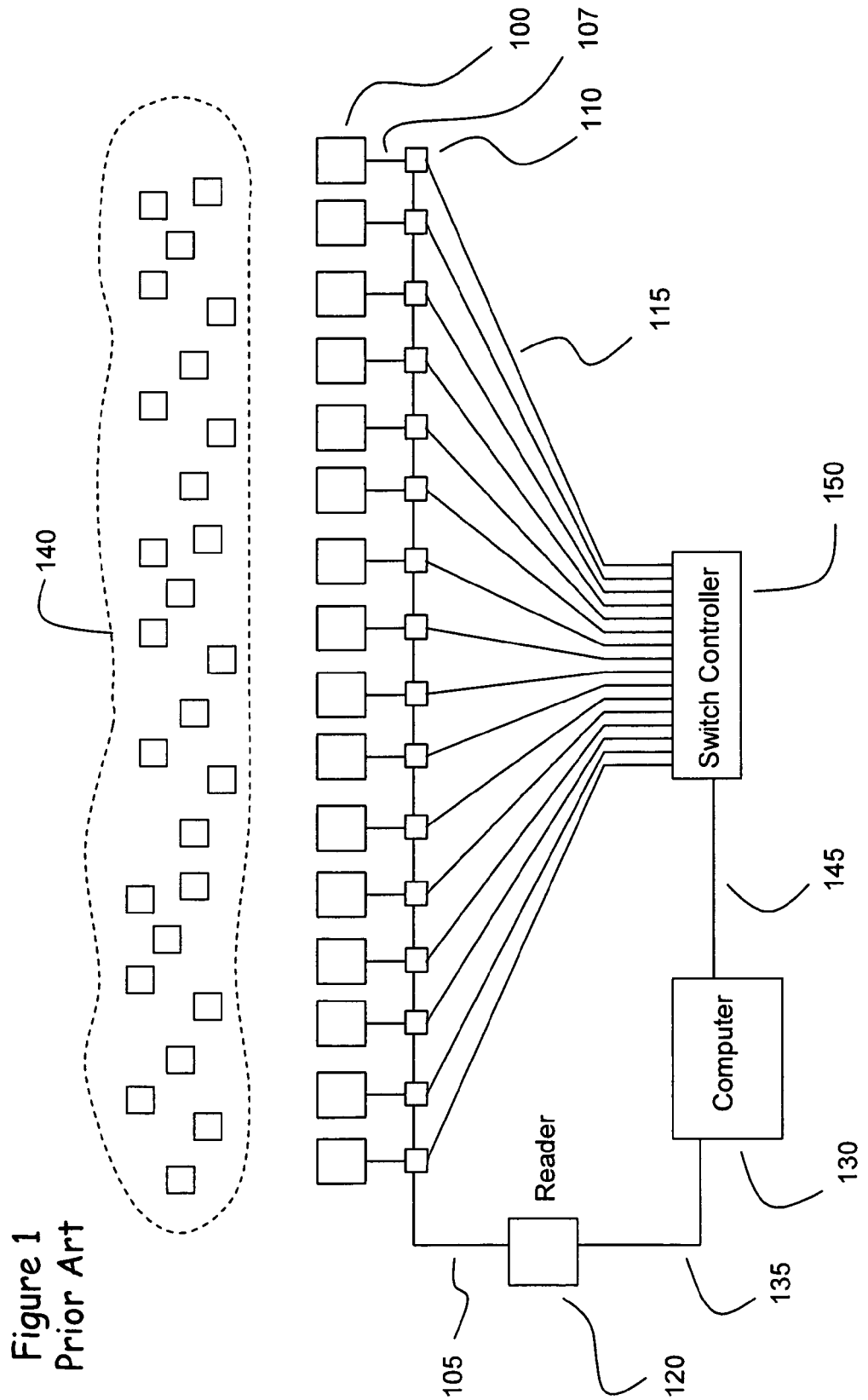
FIG. 1 illustrates a prior art approach to antenna network control using a common RF cable for a large number of RFID antennas, but a separate control line for each antenna activation relay.
Figure 2:
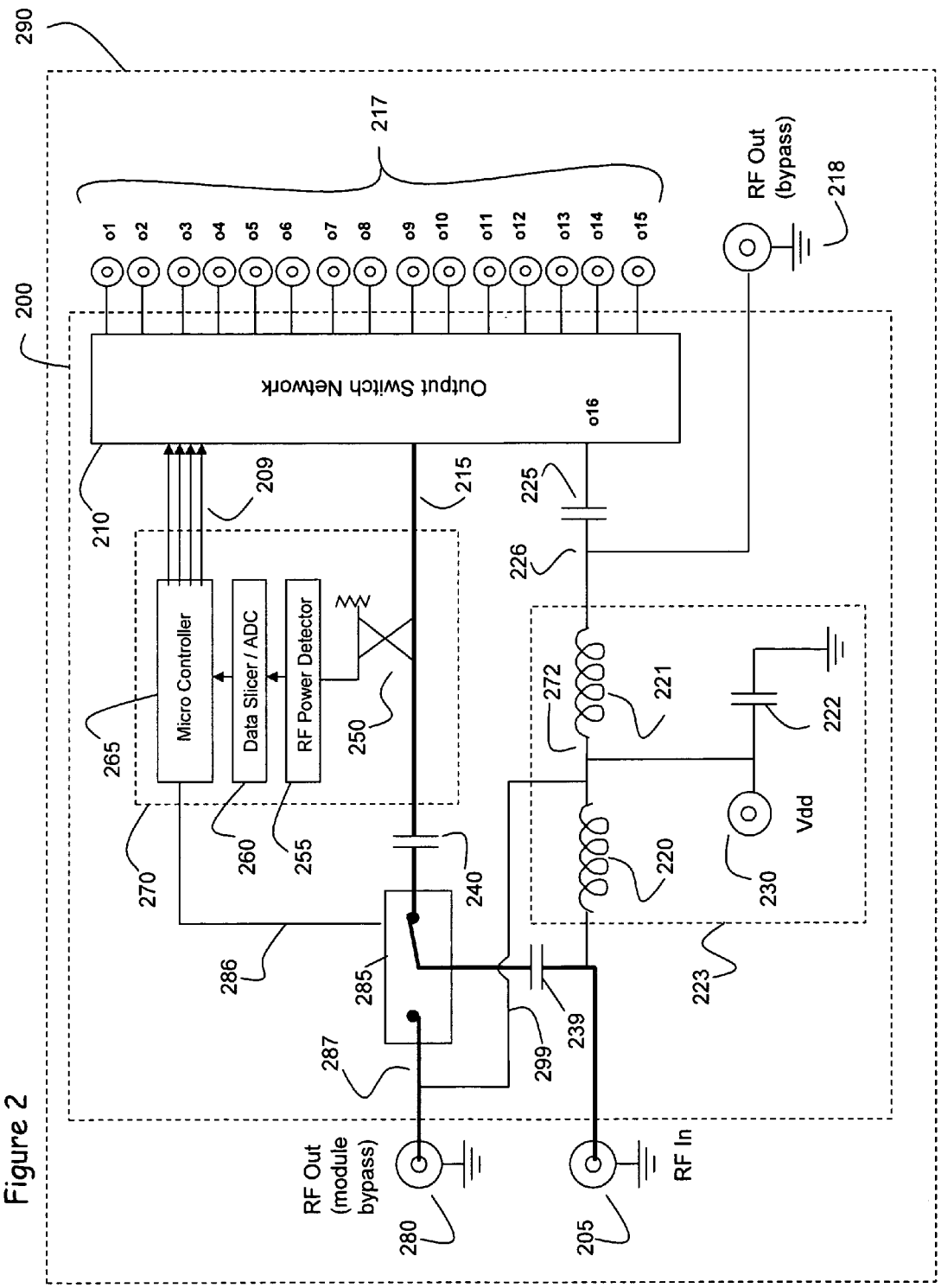
FIG. 2 illustrates an RF network control module, in accordance with one embodiment of the description provided herein.

FIG. 2 is a schematic diagram illustrating one example of an RF network control module 200, in accordance with one embodiment of the present invention. As explained in greater detail, and in accordance with one aspect of the present invention, the RF network control module 200 permits any or all of power signals, traffic signals and controller command signals to be carried on as few as one wire or cable to the RF network control module 200. As used herein, "traffic signals" are those signals or portions of signals which are intended to be selectively directed or passed through an RF network control module 200 between two ports (i.e., into one port, through an electrically connected communication path, and out of the control module via another port), as determined e.g. by the state of a switch network within the module 200. As used herein, a "port" is an input of a device at which a signal external to the device may be inputted by the device. The term port may also refer to an output of a device at which an internal signal may be outputted by the device as a signal external to the device. Controller command signals are those signals or portions of signals which represent control data or commands that control the state of the RF network control module 200, e.g. commands that determine the state of a switch network within the module 200. Controller command signals may thus be broadly viewed as signals that are associated with controlling the state of the RF network control module 200, while traffic signals may be broadly viewed as signals that are selectively directed through the RF network control module 200 as a function of its current state. In one example, controller commands may be encoded in RF signals. Command signals encoded in non-RF signals may include conventional logic-level signaling or other AC or DC voltages and/or currents. In one aspect of the invention, one or more peripheral devices may be coupled to any of the RF network control module output ports, in which case traffic signals may represent signals exchanged between such peripheral devices and other portions of an RF network via the RF network control module 200. In a further aspect of the invention, such traffic signals may specifically include RF signals. RF traffic signals may in turn, include, but are not limited to, RFID communication signals that are intended for exchange between an RFID reader and one or more transponders, or other RF signals intended to pass through an RF network control module 200 in the process of being directed to, or from, an attached device, such as a peripheral device or another RF network control module or modules. More generally, however, traffic signals may represent any type of signal intended to be directed or passed into module 200 via one port, through the module, and then out of the module via a second port, and may thus further encompass non-RF traffic signals. Non-RF traffic signals may include conventional logic-level signaling or other AC or DC voltages and/or currents. Power signals may include DC or AC signals or signal components that are provided to the RF network control module 200 for the purpose of providing a power supply to some or all of the components within the module 200 or external to the module through port 230. It should be noted however that such power signals may further be directed to one or more output ports 280, 230, 218 or 217 of said module 200 to additionally or alternatively provide power for attached peripheral devices (to be described in detail below), and in this regard, it will be apparent that a power signal directed in this manner may additionally be viewed as a traffic signal. Thus, for example, a DC voltage present at the RF input to the RF network control module 200 comprises a power signal to the extent that it is used to provide power to all or a portion of the module 200, and may further comprise a traffic signal to the extent that it is additionally directed to one or more attached devices via any of its output ports.

As depicted in FIG. 2 in accordance with one embodiment of the present invention, components of the RF network control module 200 include port 205, an internal switch network which includes a first switch network 210 and a main conductive or communication path 215, ports 217 (labeled o1, o2, o3, . . . ), and a controller 270. It should be noted that ports 205 and 217 can support flow of signals in both directions (i.e., are bi-directional ports). Merely to illustrate the behavior of the RF network control module 200 in accordance with certain embodiments, examples may describe port 205 as an "input port" and ports 217 as "output ports". However, designation of a port as an "input port" or an "output port" is not meant to suggest that such a port supports only one direction of signal flow. Also, it is to be understood that signals that may be exchanged between said ports are not limited to RF signals, but may represent other classes of signals as described above. In addition, in some applications, a RF network control module as described herein may be used for applications which do not include any RF signals. RF or other signals may thus be admitted into the RF network control module 200 through port 205 and conveyed to the RF switch network 210 via the main conductive path 215. The RF or other signals admitted at port 205 may include, for example, traffic signals intended for one of the outputs o1-o16, controller command signals which are used to direct the traffic signals to the appropriate output or outputs o1-o16, or any combination of these signal types. Thus, in one embodiment, the port 205 may be operated as a common port to input any or all of traffic signals, controller command signals, and power signals.

An RF traffic signal conveyed to a selected output o1-16 may be transmitted in the form of electromagnetic radiation, an inductively coupled signal, or a capacitively coupled signal by an antenna connected to the selected output o1-16, to a transponder (such as an RFID transponder), a handheld device, or other wireless device inside the wireless communication range of the antenna. Return traffic signals from the RFID transponder or other device may be selectively input at one or more ports o1-o15 as selected by the controller command signals. Similarly, a traffic signal may be conveyed to a selected port o1-16 which may be coupled to a peripheral device other than an antenna, such as sensors, microphones, or other devices. Return traffic signals from such other devices may be selectively input at one or more ports o1-o15 as selected by the controller command signals.

The state of the RF switch network 210 at any given time determines which of the RF outputs (labeled o1-o15) 217 are active, and thus permitted to receive or transmit a traffic signal. Alternatively, the RF switch network 210 may direct a traffic signal out of the module 200 through the port labeled o16, and the bypass port 218. One function of the controller 270 is to control the states of the individual switches inside the switch network 210 and thus control the port selection in response to the controller command signals received at port 205.

The controller 270 in this particular embodiment includes controller command recognition and decoding circuitry including a directional coupler 250, an analog RF power detector 255, a data slicer/analog-to-digital converter 260, and a micro-controller 265 to decode controller commands recognized as being encoded in RF controller command signals. Another embodiment might include a field-programmable gate array (FPGA) instead of the micro-controller. Other embodiments might make use of other types of digital logic devices rather than micro-controllers or FPGAs. Thus, code or logic may be implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., Electrically Erasable Programmable Read Only Memories (EEPROMs), ROMs, PROMs, Random Access Memories (RAMs), Dynamic Random Access Memories (DRAMs), Static Random Access Memories (SRAMs), firmware, programmable logic, etc.). Code in the computer readable medium is accessed and executed by a processor. Yet another embodiment might use a digital rather than an analog RF power detector, thus obviating the use of an analog-to-digital converter in the controller. It is appreciated that a variety of techniques may be used to recognize and decode controller commands encoded in RF or non-RF signals.

FIG. 2 shows fifteen ports 217, and also bypass ports 218 and 280, but this is by way of example only and it should be noted that other embodiments are contemplated which involve either a greater number or a lesser number of ports 217, and greater or lesser number of bypass ports, coming from appropriate switch networks.

In a further aspect of the invention, electrical power for supporting the circuit operations within the RF network control module 200 may be commonly provided by the same cabling connected to port 205 used to carry the previously described RF (and non-RF) traffic and controller command signals. In this manner, in one embodiment, one may integrate the provision of DC power, RF and non-RF traffic and controller command signals at a single port 205. In the embodiment of FIG. 2, the module 200 includes a power supply 223. In operation, a DC voltage component provided via port 205 and main conductive path 215 is separated from the RF (and/ or AC) components of the arriving signal by RF choke inductor 220 within power supply 223. Capacitor 222 charges to the DC voltage level Vdd and presents a high DC impedance to ground in a conventional manner, thereby maintaining a constant DC voltage level Vdd. This voltage may be used as a DC supply for components operating within the RF network control module 200 itself, or may alternatively or additionally be made available to other devices or modules that are attached to module 200, as further described below. It is appreciated that a variety of techniques may be used to supply power from input signals including rectifying AC input signals and low pass filtering and regulating the output to provide power for components. In the particular embodiment illustrated in FIG. 2, capacitors 239, 240 inhibit direct current from flowing into the switch control network 210 or controller 270 via this pathway. It can be readily appreciated, however, that other embodiments may be used in which direct current is also provided to switch control network 210 and controller 270 via this pathway, in which case capacitor 240 may be eliminated. In the illustrated embodiment, main conductive path 215 is coupled to controller 270 via directional coupler 250 which taps off a small amount of RF energy (e.g., less than 1%) from the signal directionally traveling from the input 205 to the RF switch network 210. This small RF signal is sent by the directional coupler into an RF power detector 255, which provides an analog signal at its output that is proportional to the power at its input. This analog output signal is converted to a digital signal by the analog-to-digital converter 260, and the digital output is provided to the microcontroller 265 for processing, as described further below.

Together the directional coupler 250, RF power detector 255, analog-to-digital converter 260, and microcontroller 265 may be used to recognize and decode various data modulation or encoding schemes and transmission power levels, enabling the microcontroller to distinguish switch control signals and other commands and data from traffic signals meant to be directed to the output ports for RF antennas, other peripheral devices, or other network devices. In one example, command signals may be encoded in an RF signal for use by an RF network control module 200 in accordance with the present description, using an external RF signal generator controlled by an external computer. In the command signal protocol used in this example, command signals may be encoded by modulating the output of the RF generator with on/off shift key modulation, for example. In one example, a signal off may represent a binary 1, and a signal on using a −8 dBm (decibel milliWatt) power level may represent a binary 0. It is appreciated that other modulation schemes and power levels may be utilized.

In this example, it is noted that a power level representing a particular binary value, such as binary 0, may drop significantly due to line or component losses by the time the signal reaches the RF network control module. For example, the power level may drop from a −8 dBm power level at the output of the external modulator to a value between −18 dBm and −20 dBm due to line and component losses. In this embodiment the RF power detector 255 may have, for example, an input signal sensitivity range from approximately −70 dBm to +10 dBm signal power. For input RF signals near the low end of this range, the power detector output may be, for example, approximately 0.5V (Volts). For each 1 dBm increase in input signal power, the output of the RF power detector may increase by approximately 0.17 mV, for example, with nearly linear response. Thus, binary 1 and binary 0 control signals from the external RF generator (generator off and generator on, respectively) can result in input signals of approximately −70 dBm and −20 dBm, respectively, at the RF power detector input, and approximately 0.5 V and 0.85 V, respectively, at the RF power detector output.

It is appreciated that there are a variety of techniques by which the power level of an input signal may be detected. For example, there may be some averaging over multiple cycles such as RF cycles to produce a relatively steady output voltage. Conversely, an output voltage or current may exhibit an oscillating signal corresponding peak-for-peak with the original input signal. Thus, the particular design may vary, depending upon the particular application.

It is also appreciated that there are a variety of techniques by which the output from an RF power detector can be converted to a digital signal appropriate for input to a microcontroller or other digital logic device. In the example embodiment described above, an analog-to-digital converter may be provided to convert the 0.5V (generator off) and 0.85V (generator on) signals to binary 1 and binary 0 respectively. Alternatively a data slicer could be used to serve the same general purpose. Again, the particular design may vary, depending upon the particular application.

As previously mentioned, the controller 270 may be adapted to detect and decode various data modulation schemes and transmission power levels in such a manner as to enable the controller 270 to distinguish controller command signals including switch control signals and other commands and data, from traffic signals meant to be directed to one or more of the output ports. Such traffic signals may then be provided to any one or a combination of devices that may be connected to the output ports, such as RF antennas or other peripheral devices, or additional network devices. In the illustrated embodiment, there is a path 272 from RF input 205 to the bypass output 218. The path 272 is substantially DC only and includes inductors 220 and 221 which are suitably sized to substantially block the flow of RF component signals from the input 205 and from the RF output o16, while at the same time allowing DC current to pass with relatively minimal impedance. If the controller 270 activates the bypass output of the switch network (labeled o16 in FIG. 2), a traffic signal such as an RF traffic signal, is directed to the bypass output 016 and is summed with the DC supply voltage provided via inductors 220 and 221 at summing node 226. The resultant signal at summing node 226 is an RF signal with DC offset voltage at the bypass output port 218 which is substantially equivalent (excepting some power reduction due to component losses) to the original RF traffic signal and offset seen at the input 205. Capacitor 225 inhibits direct current from flowing into the switch network 210 from the DC bypass path 272. It is appreciated that component signals may be summed or recombined in a variety of techniques, depending upon the particular application.

One application of the bypass output o16 operating in conjunction with summing node 226 is to allow an input signal present at RF input 205 and having both DC and RF components to be made selectively available (with possibly some small signal distortions and/or power reduction due to component losses) at the RF bypass output 218, thus enabling one to connect multiple RF network control modules such as the module 200 together in series, and have DC signal components available to all of the modules in the series chain. Providing a DC path in the bypass lines may be useful in some embodiments because some types of devices connected directly or indirectly to the outputs of the RF network control module 200 may utilize a DC current as their power source. The RF network control module 200 can provide this DC current power through the bypass, but, in this embodiment, the DC current is not available at the outputs which are not provided with the bypass. It is appreciated that in other embodiments, it may be useful to provide DC current at one or more additional outputs. Further, an unswitched DC supply Vdd may be provided at port 230 for peripheral devices, as shown. Port 230 could also be used to supply DC to the RF network control module.

The RF network control module 200 embodiment described above and shown in FIG. 2 is illustrated having one output capable of bypass. As described above, however, this is only one example of an RF network control module 200, and other embodiments will be apparent to those skilled in the art. For example, one could additionally enable output 15 (o15) for bypass by including a second set of inductors 220 and 221 wired in parallel to the first set in order to add in the DC component to the RF signal coming out of output 15. Thus, by proper setting of the switches in the switch network, the signal from the RF input 205 could be passed (with DC component included) to either of outputs o15 or o16. Other embodiments with an even greater number of bypass lines could be employed in an analogous way.

A further embodiment may include a "module bypass output" port 280, which may be selectively connected directly to module port 205 via a "module bypass switch" 285 and a bypass path 287 of the switch network located inside the RF network control module 200. The module bypass switch 285 can be operated by the controller 270 via control line 286. By proper setting of the module bypass switch 285 using the module's controller 270 or other logic device inside the module 200, RF traffic signals or other traffic signals can be directed to pass between the module's RF input 205 and module bypass output 280 without first going through the module's filtering capacitor 240 or the switch network 210 described previously. Such an approach can reduce signal loss due to filters or the layers of switches in the switch network 210, providing little or no signal loss due to the single switch (i.e., the module bypass switch) 285.

In the illustrated embodiment, it is contemplated that traffic signals may travel in either direction across the various ports identified as RF "inputs" or "outputs". By way of example only, and to illustrate this behavior, an antenna connected to a port (e.g. o1) may be provided with RFID transmission signals for interrogating a transponder via this antenna, while also receiving responsive signals from the transponder. Such responsive signals are provided back into the RF network control module via the same port o1 and out of port 205 for eventual processing by a remote RFID reader elsewhere on the network. Such bi-directional communication over a port may occur simultaneously (as with systems employing full-duplex communication protocols) or sequentially (as with systems employing half-duplex protocols). One skilled in the art will therefore recognize that the circuit in FIG. 2 may appropriately, in one aspect, be described as a device capable of merging many input paths into a single output, for example. For example, depending on the particular setting of the switches in the switch network shown in FIG. 2, signals may be admitted into the module 200 at any of the ports labeled o1 through o16, and then be made available at the port 205. That signal, if it were inputted at a bypass-enabled port (say, for example, o16 or port 280 in FIG. 2) could include a DC component along with the RF component of the signal. It is appreciated that the number of inputs and outputs and the number of signal paths may be arbitrarily selected such that signals may be input at one or more inputs and directed to one or more outputs, depending upon the particular application.

One application of an RF network control module like that in FIG. 2 is to connect a plurality of RFID antennas to a single RFID reader. Such a reader may be connected directly or indirectly through other devices to port 205, and the antennas may be connected to some of the ports 217 (labeled o1, o2, . . . , o15). Since the communication between the RFID reader and the RFID transponders (tags) located within the range of the antennas is typically two-way communication (e.g. reader sending RF traffic signals to tags at some times, and tags responding back to the reader with responsive RF traffic signals at other times), then clearly there are times when signals are passing through the RF network control module by entering at one of the ports 217 (labeled o1, o2, . . . , o15), and exiting the module at port 205. Thus the labeling of ports as "inputs" and "outputs" is somewhat arbitrary, as it depends on the perspective or reference frame which has been adopted. Hence port 205 of FIG. 2 is labeled as an input and ports 217 are labeled as outputs, notwithstanding that each may function as either an input or output port during actual operation.

It should also be noted that the embodiments described above all involve "mono-static" RFID communications in which the transmit (Tx) and receive (Rx) functions are both performed using the same antenna and antenna port. However, certain embodiments can also support "bi-static" RFID communications in which two antennas are used for each RFID link (one antenna for transmission of the signal out to the population of tags, and a second antenna for receiving the tags' response for conveyance back, ultimately, to the reader). This could be done in various ways. Merely for illustration, two approaches will be discussed, but other approaches may be used without departing from the scope of the embodiments. In the first approach, some of the ports o1 through o15 may be labeled as Tx ports, with the other ports labeled as Rx ports. This would allow placement of signal amplifiers inside the RF network control module on the Rx ports, thus improving the processing of the weak return signals typical of passive RFID applications. In the second approach, Tx and Rx ports may be chosen arbitrarily (i.e., without planning prior to device setup) and amplifiers could either be omitted or included outside of the RF network control module on the Rx lines. In addition, amplifiers could be included within the RF network control module so that the amplifiers could be switched into the circuit as desired.

Figure 3:
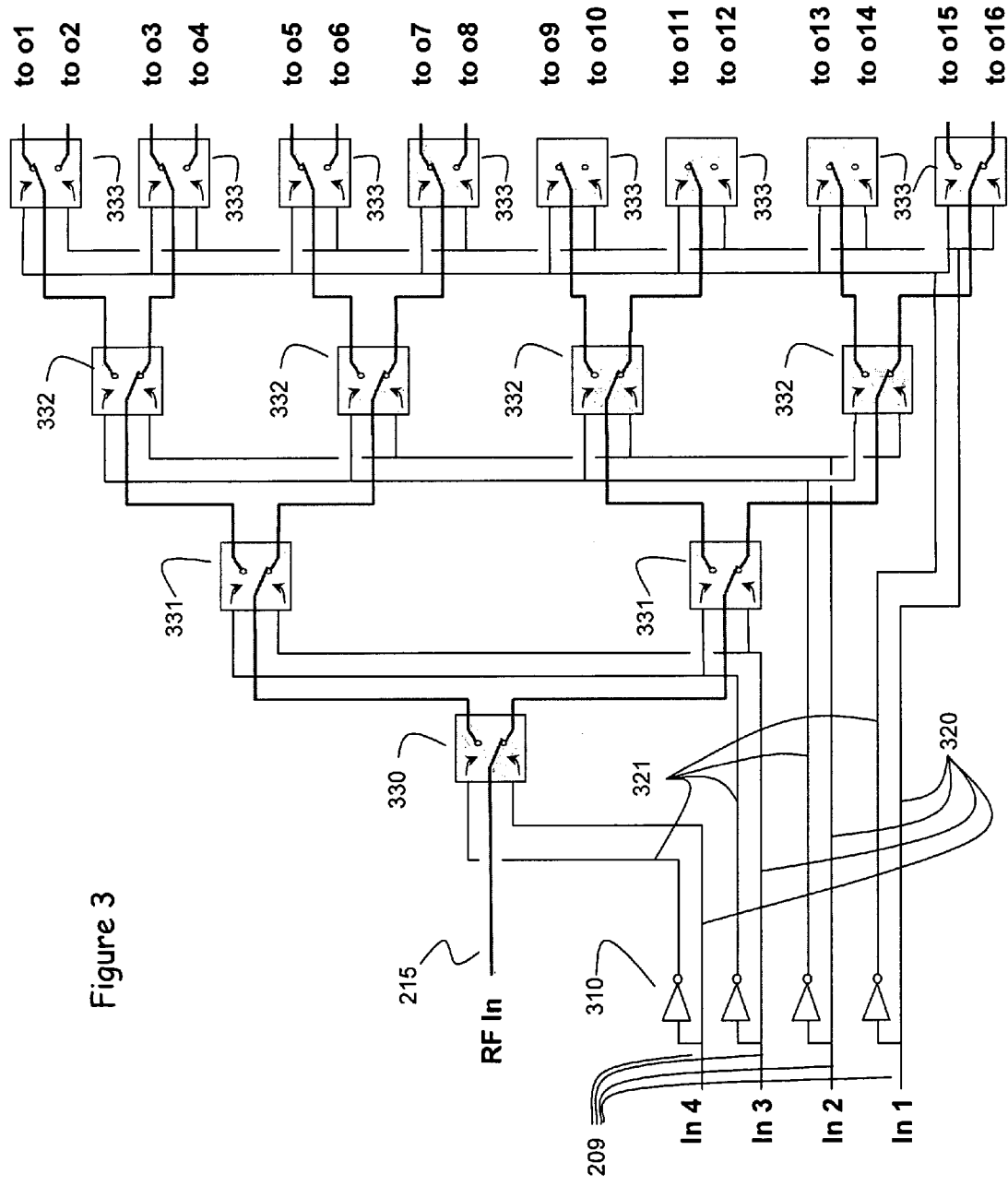
FIG. 3 shows an example of an RF switch network which uses output from a microcontroller to select or activate a specific antenna in the array.

FIG. 3 shows in greater detail and schematically one possible embodiment of the RF switch network 210 illustrated in FIG. 2. It is noted that those of skill in the art will recognize that a variety of implementations are available for providing the desired function of the RF switch network, and the embodiment of FIG. 3 is therefore intended solely to facilitate the description of one aspect of the invention, and should not be viewed in a limiting sense. In the embodiment of FIG. 3, line 215 at the input to the switch network 210 carries the RF signal (without any DC component, in this embodiment) into the switch tree of switches 330, 331, 332, 333, and the four input lines 209 (labeled ln 1, ln 2, ln 3, and ln 4) each carry a digital logic signal (e.g., high voltage or "1" or low voltage for "0") set by the digital logic device (e.g., FPGA or a microcontroller) 265 in the RF network control module's controller 270. While four input lines are shown to illustrate the operation of this embodiment, it will be understood by those of skill in the art that greater or fewer than four lines may instead be used without departing from the scope of the invention. For each of these input lines, the input is split using an inverter 310 such that a voltage level corresponding to a logic 1 is converted into a logic 0, and a 0 is converted into a 1. The effect of the inverters is to split each input line into a pair of complementary logic lines 320 and 321. In this example, if one line in an input line pair is 1, the other is a 0. Also shown in FIG. 3 are several layers of two-input, two-output switches. The first switch 330 constitutes the first layer. This switch feeds the second layer of switches 331, which in turn feed the third layer of switches 332. The third layer of switches feeds the fourth layer of switches 333, which feed the antennas. Each switch is operated by a respective pair of control lines 320 and 321. The polarity of the switch input pair (e.g., either 0/1 or 1/0) determines which of the switch outputs is active, as further described below.

Figure 4:
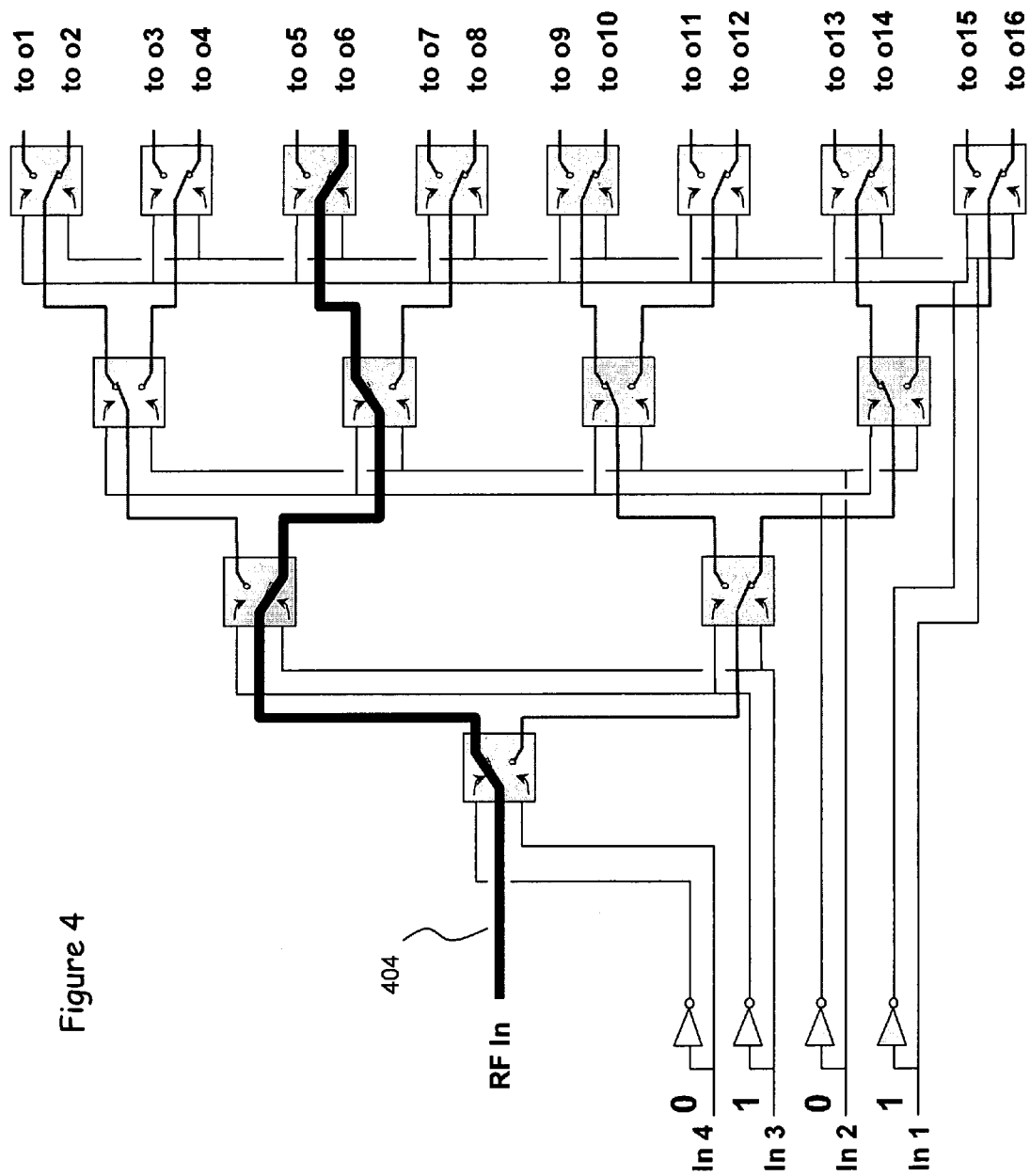
FIG. 4 illustrates a specific example of an RF switch network state.
Figure 5:
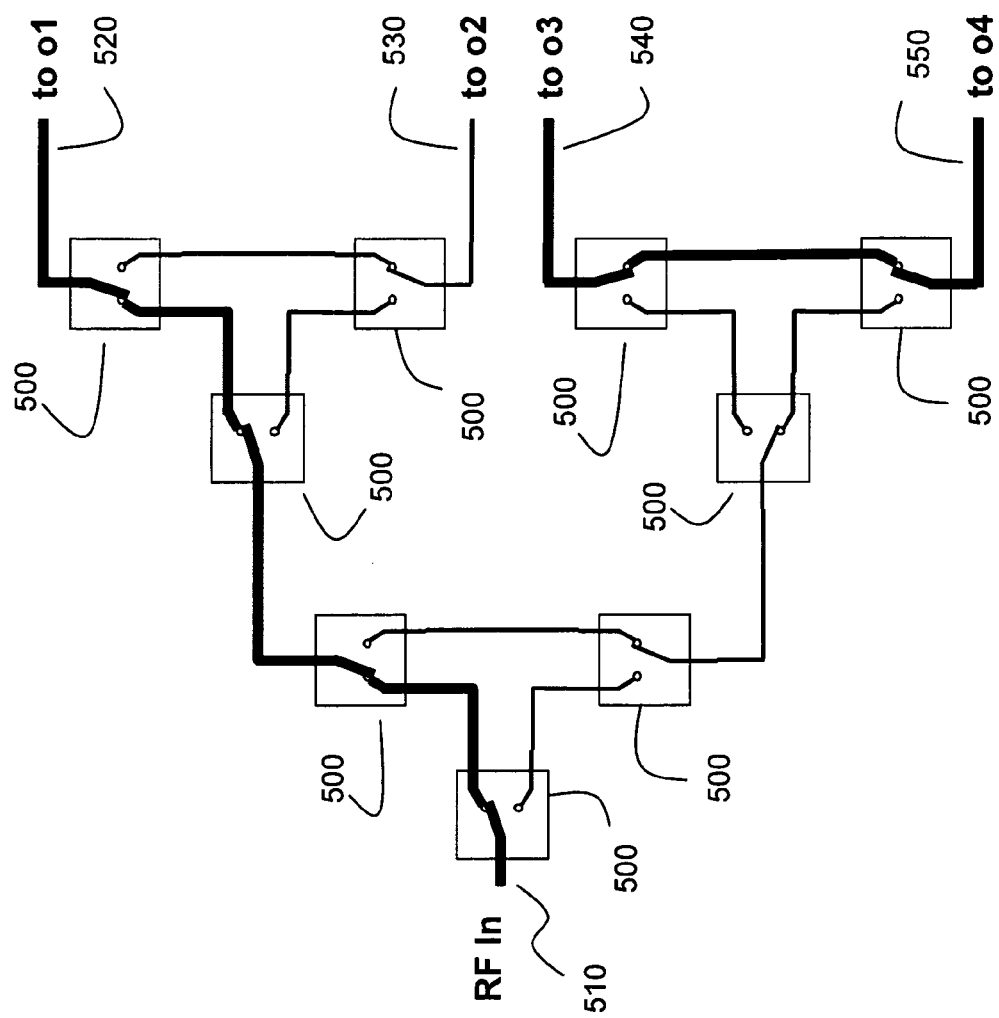
FIG. 5 illustrates a switch network made from three sets of three single-pole/double-throw switches, and which has the potential to provide multiple communication paths active within the RF network control module at a same time, in accordance with one embodiment of the description provided herein.

Consideration of the selectable signal paths depicted in FIG. 3 reveals that any of the antennas (or other peripheral devices or bypass outputs) may be selectively activated by an appropriate choice of logical inputs on lines ln 4, ln 3, ln 2, and ln 1. A switch state example is shown in FIG. 4 which provides a communication path 404 from the main communication path 215 of FIG. 2 to a selected output, o6, in this example. Here the switch network inputs are 0, 1, 0, and 1 for lines ln 4, ln 3, ln 2, and ln 1, respectively. This input state activates RF output o6. It should be noted that the design of the RF network control module's switch network shown in FIG. 3 and FIG. 4 is given here as only one example of many which are suitable. For other switch network designs, multiple inputs may be activated, either one at a time or more than one at a time, and may be directed to multiple outputs, either one at a time or more than one at a time, via multiple communication paths, either one at a time or more than one at a time, depending upon the particular application. FIG. 5 illustrates a switch network made from three sets of three single-pole/double-throw switches, and which has the potential to provide multiple communication paths active within the RF network control module at the same time, in accordance with one embodiment of the description provided herein. In FIG. 5, the switches are set such that a path is created between RF in 510, and output o1, 520. At the same time, a communication path is created from output o3, 540, to output o4, labeled 550. It is appreciated that it may be appropriate under some circumstances to disconnect the input or inputs from any of the outputs for certain intervals. Furthermore, various types of switches are suitable, including semiconductor, PHEMT GaAs IC, electromechanical, and waveguide switches.

As described previously herein, a common cable connected to the RF input of the RF network control module may carry any one of a variety of different signal types, including both RF and non-RF traffic signals, controller command signals or other data signals, and power signals. The microcontroller or other digital logic device in the RF network control module's controller is therefore provided with the capability of appropriately distinguishing between those RF input signals which are meant for conveyance to and through an RF output ("traffic signals"), and those RF input signals which are intended for the controller as commands for selecting a particular RF output ("controller command signals") to which traffic signals are to be directed. Additionally, power signals may be separated from other signal types such that they can be made available to peripheral devices or components within or outside the control module as desired. One approach which may be used for distinguishing between traffic signals and controller command signals is to use low power levels for communication of the command signals and relatively higher power levels for communication of the RF traffic signals. This approach may be suited to those applications in which the elements inside the controller (e.g., directional coupler, power detector, ADC, and micro-controller) present high input impedances at their interfaces with the signal pathways, and thus typically do not require a high-power signal for operation. In contrast, certain RF traffic signals (e.g., RFID signals for powering antennas in order to communicate with transponders inside the range of the antennas) frequently do utilize a much higher power signal. Thus, in the illustrated embodiment, a threshold power level may be defined which is used to distinguish between RF traffic signals on one hand, and command and other data signals on the other. Such a threshold may be programmed into the controller's digital logic device, or otherwise specified via software or hardware programming and/or configuration. The controller monitors the power level of the signals entering the RF network control module at its input port and compares the power level of the signals with the threshold power level to determine whether it should interpret the signals as command signals or traffic signals. It should be noted that under some circumstances of operation it may be appropriate to change the threshold power level (e.g., to overcome changes in noise in the environment or limits of devices newly connected to the RF network control module). In those situations the threshold power level could be changed by issuing the appropriate command to the controller.

In many typical RFID applications, the power levels used are often in the range of 12-30 dBm in order to power on a transponder. 0 dBm equals one milliWatt of RF power into a 50 Ohm load. Since wire transmitted commands can be typically be received over a wire using much less power, a network module in accordance with the present description can examine the power of the incoming RF signal and readily determine if the signal is a controller command signal or a traffic signal to be directed to an output. Thus, for example, RF power levels from −80 to −20 dBm may be interpreted by the controller 270 as a logic 1 command bit, and −20 to 0 dBm as a logic 0 command bit. Power levels greater than 0 dBm may be interpreted as traffic signals to be ignored or directed to one or more of the output ports. It is appreciated of course that other threshold values may be selected to distinguish logic levels and traffic and control signals, depending upon the application. For example, in some applications, a power level of 5 dBm or greater may be used to distinguish traffic signals from controller command signals. In other applications, a power level of 10 dBm or greater may be used to distinguish traffic signals from controller command signals. Again, the actual threshold values may vary, depending upon the particular application.

RF power tends to fall off relatively quickly when radiated over the air. Because of this fact, most RFID communications utilize orders of magnitude more power than would be typically be utilized for communications limited to propagation over a conductive wire such as a cable. Set forth below are some representative standards and power levels for RFID applications:

| Frequency range | Method of communication | Allowed Field Strength/ transmission power |
| --- | --- | --- |
| 125-148 Khz | Inductive coupling | 72 dBuA/m |
| 13.56 MHz +− 7 Khz | HF Inductive coupling | 42 dBuA/m, 1-10 Watts |
| 433 MHz | UHF backscatter coupling, can be used with active tags. | 10-100 milliwatts |
| 868-870 MHz | UHF backscatter coupling, Used in Europe. | 500 milliWatts |
| 902-928 MHz | UHF backscatter coupling, Used in the US. | 2 Watts spread spectrum |
| 2.4-2.483 GHz | ISM backscatter coupling, Used in the US and | 4 Watts spread |

-continued

| Frequency range | Method of communication | Allowed Field Strength/ transmission power |
|---|---|---|
| | Canada. Can be used with active tags. | spectrum. |
| 2.4-2.483 GHz | ISM backscatter coupling, Used in Europe. | 500 milliWatts |
| 5.725-5.875 GHz | Future use | 4 Watts |

As previously mentioned, the power levels set forth above tend to be orders of magnitude greater than what is typically used to send RF communications over a wire. One example of a suitable power level for RF controller commands signals is −8 dBm which is approximately 0.2 milliWatts. It is appreciated of course that other values may be selected to transmit controller command signals, depending upon the application.

Furthermore, it is recognized that there are a number of different standards used for RFID communications today. Different countries often utilize different frequencies and different products often utilize different frequencies. The frequency ranges and power levels are typically controlled by regulatory groups such as the Federal Communication Commission (FCC) in the United States, for example. Since many if not all of these standards are intended to provide for communication with transponders that are typically communicating over some distance in the air, the power levels used are often relatively high. Nevertheless, it is appreciated that the power levels selected for a particular application may depend upon the country of use and the particular products being utilized.

In the illustrated embodiment, the traffic signal routing components of the module 200 are capable of handling both low power and high power signals and both RF and non-RF signals. Thus, for example, the communication paths 215, 272, 287, the switch networks 210, 285 and the various filtering elements 220, 221, 222, 240 can handle low power signals as well as high power signals including RF signals having a power level in excess of 5 dBm in some applications, or in excess of 10 dBm in other applications, or in excess of 12-30 dBm in other applications, depending upon the particular application.

In another embodiment, controller command signals may be distinguished from traffic signals using an RF power level range. If the RF power is greater than a lower RF power threshold value and less than an upper RF power level threshold value, the signal may be interpreted as a traffic signal rather than a command signal. It should be noted that the upper RF power threshold value and the lower RF power threshold value can be adjusted to overcome changes in noise in the environment of limits of devices newly connected to the RF network control module.

In another embodiment, controller command signals may be distinguished from traffic signals using a defined "start frame command" and a defined "end frame command". Each start frame command or end frame command may be defined using appropriate bit value sequences in the associated command signals provided to controller 270. In this approach, the controller monitors the signals coming into the RF network control module's RF input and, when it encounters a bit value sequence corresponding to the start frame command (in accordance with some appropriate data encoding approach such as Manchester encoding or some other commonly known data encoding), it begins to interpret subsequent RF signals as controller command signals. Similarly, when it encounters a bit sequence corresponding to the end frame command, the controller ceases to interpret subsequent RF signals as controller command signals until the next start frame command is encountered.

It is further appreciated that the RFID protocols used by RFID readers, may be used for controller command recognition. In this embodiment, a unique bit pattern would be interpreted as the start of command data. Data bits may have the same data format as that used by the transponders. For example Amplitude Shift Keying may be used where variations in the carrier level determine 0 and 1 bits. Furthermore, the same or substantially the same frequency range as well as data modulation and data encoding protocols used for the RFID traffic signals may be used for RF controller command signals.

In another embodiment, a combination of signal differentiation methods may be used. Thus, in one example, start frame and end frame bit value sequences may be used to separate controller command signals from traffic signals, and at the same time the power level of the controller command signals may be significantly reduced below the value of the RFID or other traffic signals. Again, a convenient threshold power level between command signal power and traffic signal power can be readily defined. While either of the signal differentiation techniques may be used alone, it is believed that using two or more signal differentiation techniques together may, depending upon the application, reduce the likelihood of mis-identifying command signals as traffic signals, or traffic signals as command signals. When used in combination, therefore, the robustness of the signal differentiation may be increased if appropriate for a particular application.

A further technique that may be employed for signal differentiation is to provide the controller with a power-on reset process or routine. Such a power-on reset may, for example, be a program (such as, for example, a firmware routine) or other algorithm which the controller executes after experiencing a loss of controller power. Alternatively, a predefined hardware state may be established in digital logic circuitry upon a power-on reset condition. That is, if the power used to operate the micro-controller or other digital logic device inside the controller is cycled (i.e., substantially reduced or eliminated, and then restored) the controller or other hardware may be configured to return to a reset or base state, in which subsequent signals coming into the module's RF input are interpreted as controller command signals, rather than traffic signals. At some later point, when the controller encounters an end-frame bit sequence, for example, or when signal power begins to exceed the threshold power level stored in controller memory (or a combination of both, as described previously), then the controller may be configured to cease to interpret the RF input signals as controller command signals, and resume interpreting incoming signals as traffic signals. In this application as well as other embodiments described herein, power signals, traffic signals, and command signals may all be presented to the module via a single, common input.

Yet another method may include various combinations of aforementioned methods. For example, another method would provide for the network control module to power up in a command state. Thus, in this command state following powering up or resetting of the module, the controller of the module could interpret RF power levels below −20 dBm, for example, as being logic 1 command bits, and power levels above −20 dBm as being logic 0 command bits. Optionally, power levels above yet another power level, such as 0 dBm, for example, could be interpreted as traffic signals rather than command signals in this command state. The module would remain in this command recognition state until it received a command that told it to ignore all subsequent RF signals and assume they are only traffic signals. It would remain in this traffic state until it was powered off or reset. It could also leave this traffic state after some predetermined time or period of no RF power being received. It is appreciated that other intervals of time may be defined as marking command recognition states in which the module would expect to receive command signals.

Thus, the particular method used to distinguish controller command signals from traffic signals may vary, depending upon the particular application. Still other distinguishing methods include using different frequency ranges for command and traffic signals, using a varying digital voltage level on the cable connected to the module input, etc.

To identify the individual bits of a digitally encoded controller command signals, a number of protocols may be employed. One protocol, for example, may be used to distinguish between logic levels 0 and 1 as discussed above. Another protocol may be used to determine, for example, the start and end of a bit, and the start of the next bit, etc.

It is appreciated that there are a variety of suitable methods and protocols. For example, the time duration or period for each bit may be predetermined. The module 200 in monitoring the input may identify a transition from a logical 1 to a logical 0, for example. Such a transition may be interpreted as a start bit. Then each subsequent bit may be sampled at a fixed period after the start bit. Such a bit sampling protocol is utilized by many Universal Asynchronous Receiver/Transmitters (UARTs) and modems. Typical data bit rates can vary from 100 to 100000 bits per second, for example. Other examples of suitable protocols include those protocols frequently employed in recognized standards for RFID communications.

In addition to the controller command signals described previously herein, the common cable connected to the RF input of the RF network control module can carry response commands from the RF network control module's controller to external control units in the RF network (host system). These response commands may contain various forms of information, such as response messages to commands received by the RF network control module or messages transmitted by the RF network control module such as to provide diagnostics information such as RF power level detected at the RF input. These response communications can be sent by the RF network control module using a variety of techniques which are described below in detail. The host system controller can distinguish these response signals from traffic signals using the same techniques previously described herein to distinguish between traffic signals and command signals.

A first communication technique used by the RF network control module to communicate with the host system is through a load modulation approach. In this case, the communication channel is two-way, half duplex utilizing a fixed frequency RF carrier wave. The frequency chosen for the data carrier wave can be the same or substantially the same frequency range used by the RFID traffic signals or it can be a frequency that is chosen to avoid the tuned band of the antennas to minimize the impact of signal leakage from the antenna elements. Communication from the RF network control module to the host system is through an ASK (amplitude shift keying) modulating reflection of the host's data carrier wave. Switching the termination within the RF network control modules of the host's carrier wave between two loads with different reflection values causes the wave reflected back to the host to be ASK modulated according to the switching signal. Switching of the two loads allows for two levels of encoding or the ability to transmit 1 data bit.

A second communication technique used by the RF network control module to communicate with the host system is through ASK (amplitude shift keying) or OOK (on-off keying) modulating of an RF signal generator built within the RF network control module. This modulated signal is sent over the common cable connected to the RF input of the RF network control module back to the host system or it could be sent over any other port. The frequency chosen for the data carrier wave can be the same or substantially the same frequency range used by the RFID traffic signals or it could be a frequency that is chosen to avoid the tuned band of the antennas to minimize the impact of signal leakage from the antenna elements. If full duplex communications are desired, the frequency for communications between the RF network control module and the host system can be chosen such that it does not interfere with the frequency utilized by the host system to communicate with the RF network control module. In addition, other modulation schemes can be utilized for the communications between the RF network control module and the host system such as FM (frequency modulation), PSK (phase-shift keying), DPSK (differential phase-shift keying), BPSK (binary phase-shift keying), etc. A bi-directional half-duplex baseband communication protocol can also be utilized.

Figure 6:
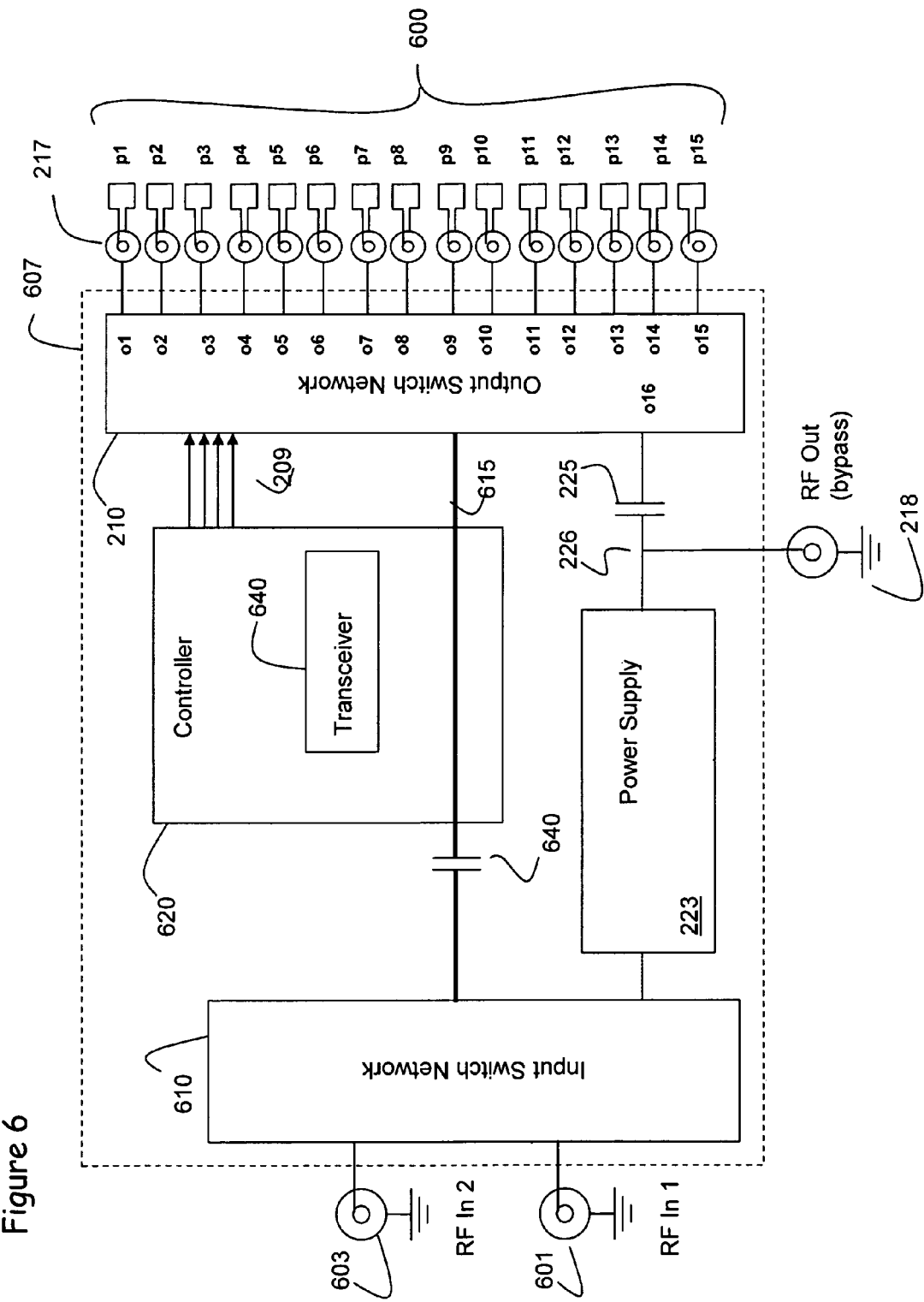
FIG. 6 illustrates an RF network control module in accordance with another embodiment of the description provided herein.

RF network control module embodiments have been described above in connection with one RF input port. However, there may be some situations in which it is appropriate to have two or more RF input ports 601 and 603 as shown in FIG. 6 for RF network control module 607. FIG. 6 illustrates an RF network control module in accordance with another embodiment of the description provided herein. In FIG. 6, transceiver 640 is inside of controller 620. The ports 601 and 603 are coupled by a first switch network or "input switch network" 610 and a main communication bus 615 to a second switch network or "output switch network" 210. As described previously herein, the first switch network 610 and the second switch network 210 can be designed in such a way as to allow for two communication paths to be created through the RF network control module at the same time. The bus 615 is a bundle of individual conductive paths (similar to path 215 of FIG. 2), each capable of carrying a signal from an input of switch network 610 to an output of switch network 210. In general, each conductive pathway on the bus might have its own isolation DC-blocking capacitor, and be coupled by either a common or by its own directional coupler to the power detector inside the controller (not shown in FIG. 6).

Figure 7:
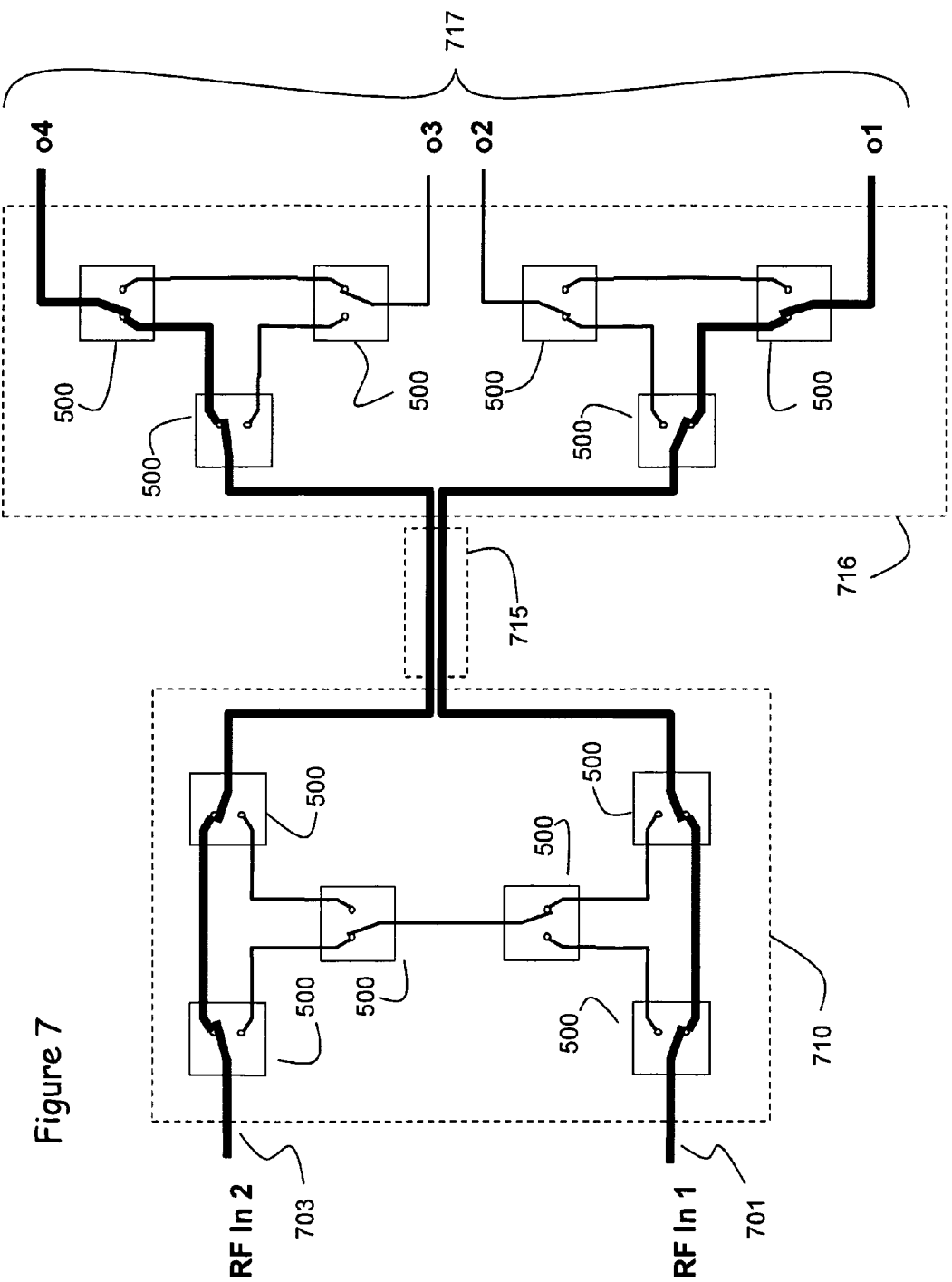
FIG. 7 illustrates one example of a particular embodiment of input and output switch networks and a communication bus.

FIG. 7 illustrates one example of a particular embodiment of the input and output switch networks and the communication bus. FIG. 7 shows two RF inputs 701 and 703, input switch network 710, communication bus 715, output switch network 716, and also several RF outputs 717. With the particular switch settings shown in FIG. 7, a communication path is created from RF input 701 to RF output o1, and another independent and simultaneous communication path is created from RF input 703 to RF output o4. It would be recognized by one skilled in the art that there are many other designs appropriate for the input and output switch networks which provide a wide variety of input-to-output connection possibilities, and the embodiment shown in FIG. 7 is given by way of example only, and is not meant to limit the scope of embodiments of the invention. In the embodiments shown in FIG. 6 and FIG. 7, the input ports could, in a manner analogous to the single-input embodiments already discussed, carry all appropriate types of signals, such as, for example, power, traffic and controller command signals. As discussed above, such signals may optionally include both RF and DC components for each signal, and high or low voltage-based signals.

Situations in which such a multiple-input-port RF network control module 607 may be appropriate include applications where redundant network support of the module is useful (e.g., several readers or other RF network devices utilizing access to the same RF network control module at different times). Using multiple input ports on the same RF network control module can, depending upon the particular application, reduce or eliminate provisions for an external switch for switching between multiple inputs. Also, a capability is provided to use the RF network control module as a particular variety of an RF network routing device or smart switch by using multiple inputs on a common module, along with the appropriate firmware inside the controller or other digital logic device controlling the input port selection via the input switch network inside of the RF network control module. That is, with multiple inputs and multiple outputs, the RF network control module can use internal logic and controller commands sent to it through its various ports to control its internal switching of inputs and outputs, rendering the RF network control module into a useful RF network scaling, managing, and control device. For reasons of simplicity and cabling economy, however, it may be more appropriate in certain applications to provide a single RF input port on an RF network control module.

In a further aspect of the invention, an RF network control module may be configured to interface (e.g. via its output ports) with a wide variety of peripheral devices. In such a configuration, the RF network control module may be described as a peripheral array or a portion of a peripheral array. As used herein, a "peripheral array" denotes an RF network control module (in any one of a number of different possible embodiments), with one or more peripheral devices attached to or coupled with the RF network control module outputs. FIG. 6 illustrates a plurality of peripheral devices 600 coupled to outputs o1, o2 . . . o15 of the module 607, thereby forming a peripheral array. In this embodiment, each of the peripheral devices is attached to the RF network control module at a separate output port of the module, thereby forming an embodiment of a peripheral array. Some peripheral devices may utilize only RF signals (with no direct-current signal component) and can thus be coupled to the RF network control module at one of the module's RF outputs (without a bypass). On the other hand, other peripheral devices may utilize a direct-current signal component (e.g., for supply of peripheral device power) and therefore be provided access to one of the bypass ports on the RF network control module.

Figure 8:
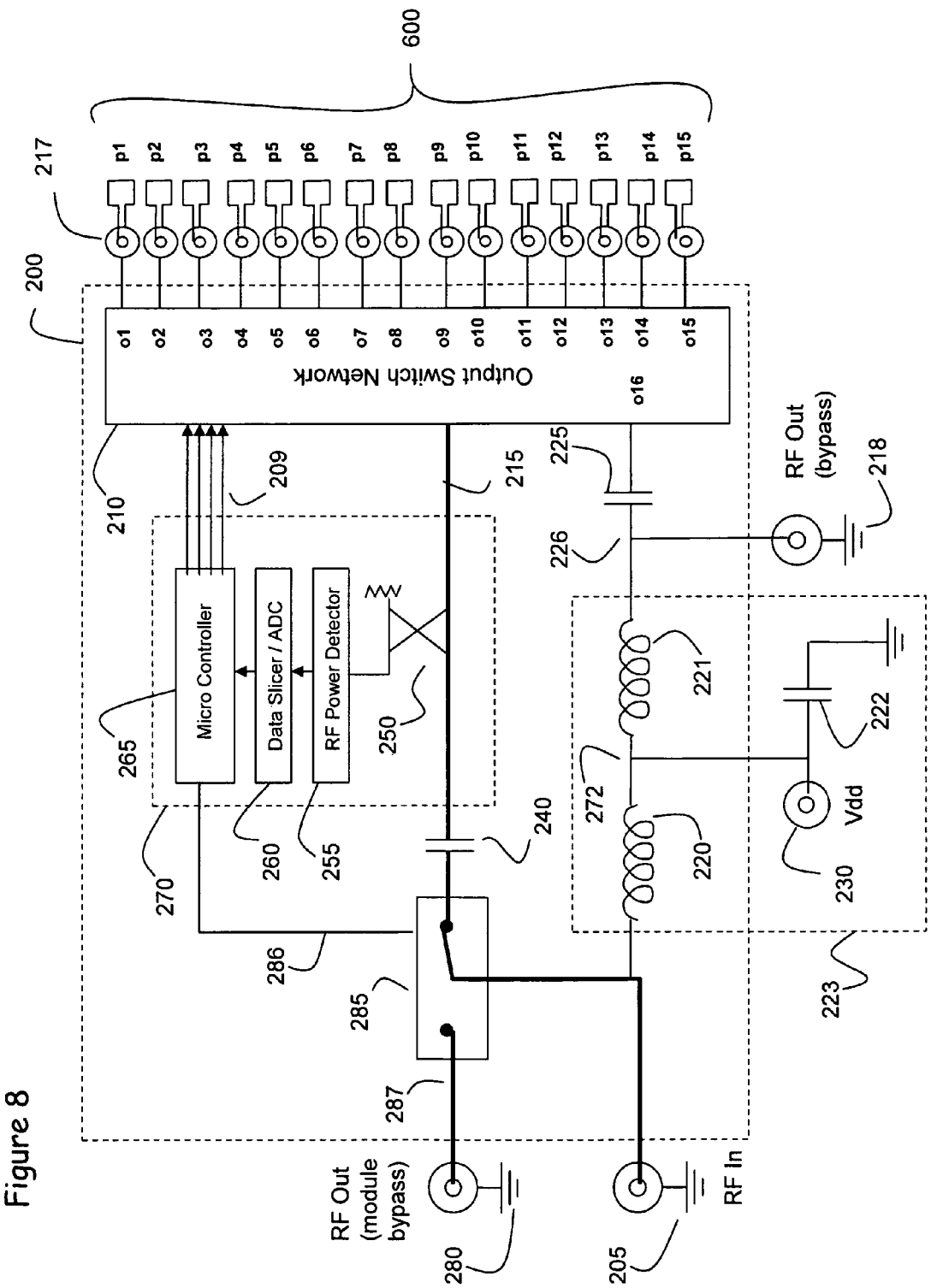
FIG. 8 illustrates one example of a peripheral array in accordance with the present description.

One peripheral device which often does not require a direct-current signal component is an antenna. FIG. 8 shows one example of a peripheral array which includes peripheral devices p1, p2 . . . p15. In this example, peripheral devices p1, p2 . . . p15 in the form of antennas 600 have been connected to each of the RF outputs o1 through o15. All of the other components of the peripheral array are the same as those shown in the FIG. 2 illustration of the supporting RF network control module. One application of the peripheral array embodiment disclosed here is the support of a large number of RFID antennas using only one or a small number of RFID readers on a network. There are some RFID applications in which it is appropriate to have a large number of antennas for communication with RFID tags or transponders. One such application is that of passive RFID tags attached to sales items in a retail store, with antenna-equipped peripheral arrays built into or placed on top of the retail shelving. RFID readers or other RF transmitter receivers on the network to which the peripheral array is connected can select any of the antennas of the peripheral array by sending an appropriate controller command signal to the peripheral array that identifies the output port to which the selected antenna is connected. This command signal is interpreted by the controller inside the RF network control module of the peripheral array, and the controller then selects the appropriate port using the switch network of the RF network control module. With the appropriate port selected, all subsequent RF traffic signals such as RFID commands to the tag and replies from the tag flowing between the RFID reader (located somewhere on the network to which the peripheral array is connected) and the peripheral array use the antenna connected to the selected port. Note that these port/antenna selection and subsequent RFID communications processes may use a suitable signal differentiation approach including those approaches previously described to distinguish between controller command signals and traffic signals.

One or more of the capabilities of the RF network control module discussed above are believed to be useful in a variety of applications including supporting, for example, shelf-edge-mounted Liquid Crystal Displays (LCD), motion detectors, WiFi access points or any other sort of peripheral device that may be serviced by the RFID network wiring infrastructure and RF network control modules described herein. For example, aspects of the invention described support embodiments comprising "smart shelving" that may be built in sections, with several (for example, 4, 8 or 16) antennas in each section, and as few as one cable running between sections. The cable may have a single conductor (shielded or unshielded) carrying the power, command and traffic signals between the modules. In other embodiments, the cable may have multiple parallel conductors. Each individual section may comprise a peripheral array, with multiple sections interconnected (e.g. in series or in parallel) using the appropriate output bypass configurations described previously. Thus, for example, the bypass output port of a first section may be connected using a single cable to the RF input of a second section, thereby providing each of the sections access to power signals, traffic signals, and command signals appearing on the network via a single-cable interconnection. Further, it is believed that electrical connections within a section can be made economically during mass fabrication (e.g., during circuit board etching) and the shelf sections can be installed relatively quickly and cheaply, and maintained easily, by virtue of the single input to each section. It is appreciated that in other applications, other benefits may be utilized, either in addition to or in lieu of those discussed herein.

It should be noted that RFID communications are not the only type of RF communications which could make use of a peripheral array to support a large number of antennas or other peripheral devices. Other examples include communications with handheld devices over a network using antennas specially designed for near-field coupling (NFC) methods (e.g., at 13.56 MHz), or Bluetooth device-to-device communications. None of the examples given here (RFID or otherwise) should be viewed as limiting the application of the peripheral array devices described herein. For example, the peripheral array described here could support many different types of antenna.

In addition to antennas, other peripheral devices which could be externally coupled to modules or internally incorporated into and supported by the modules of the peripheral array devices described herein, include temperature sensors, pressure sensors, chemical sensors, vibration sensors, video display units, microphones, audio speakers, audio headphones, push-buttons and push switches, data entry keypads, near-field-coupling wireless interface units for communication with handheld and mobile devices, local-area-network wireless access points, personal-area-network wireless access points, indicator lights, and light sensors. In one application, the main module controller could be utilized to activate or deactivate the port to which the peripheral device was connected. Such an arrangement may be useful for a variety of peripheral devices including those peripheral devices having their own controller and interface such as an RF interface. In other applications, the peripheral device may have a controller device which functions as a state machine having various states and flag bits which may be set by the module controller or by devices coupled to the module input.

It is contemplated that some of these peripheral devices could include collections of the types of peripheral devices mentioned (e.g., a collection of light sensors in a digital imaging device). Also, the peripheral devices inside the peripheral array could be designed to exchange raw data (e.g., voltages) with the controller of the network control module of the peripheral array, or the peripheral devices could contain their own analog-to-digital converter, RF generators, modulators, software radios, other data conditioners and aggregators, or other components designed to interface with the controller in the peripheral array, or other network devices connected to and accessible through the peripheral array.

The peripheral array devices described herein are suitable for a variety of applications including applications in which the various components of a peripheral array are placed into a single housing or enclosure. Similarly, the various components of a peripheral array may be mounted on a single circuit board. These arrangements can facilitate installation. For example, the RFID antennas in a peripheral array may be included inside the same enclosure as the RF network control module's elements. Such an embodiment may also include a number of empty (unconnected) RF output ports on the peripheral array which are accessible from outside of the enclosure. These can be used to attach peripheral devices (e.g., video displays mounted on the edge of RFID-enabled retail shelving) at some convenient time after the installation of the peripheral array.

In another embodiment, all of the elements of the RF network control module are included within a single enclosure or unit, as represented by the member 290 in FIG. 2. Similarly, the various components of the RF network control module may be mounted on a single circuit board as represented by the member 290. However, in this embodiment, some or all of the antennas or other peripheral devices are not included in the enclosure 290. Rather, the RF network control module's RF output and bypass ports 217, 218 are made accessible from outside of the enclosure for later installation of peripheral devices. This embodiment is useful in various applications including applications in which it is not known at the time of installation exactly what type or how many antennas or other peripheral devices may be needed, or when they may be needed, or if their locations and types may need to be changed from time to time.

When either the RF network control module or some version of the peripheral array is being manufactured in mass prior to determination of the final form factor (of the enclosure or fixture into which they are to be installed), it may be appropriate to place all of the elements of the RF network control module or the peripheral array on a single circuit board to facilitate subsequent handling and installation once the final form has been decided.

Figure 9:
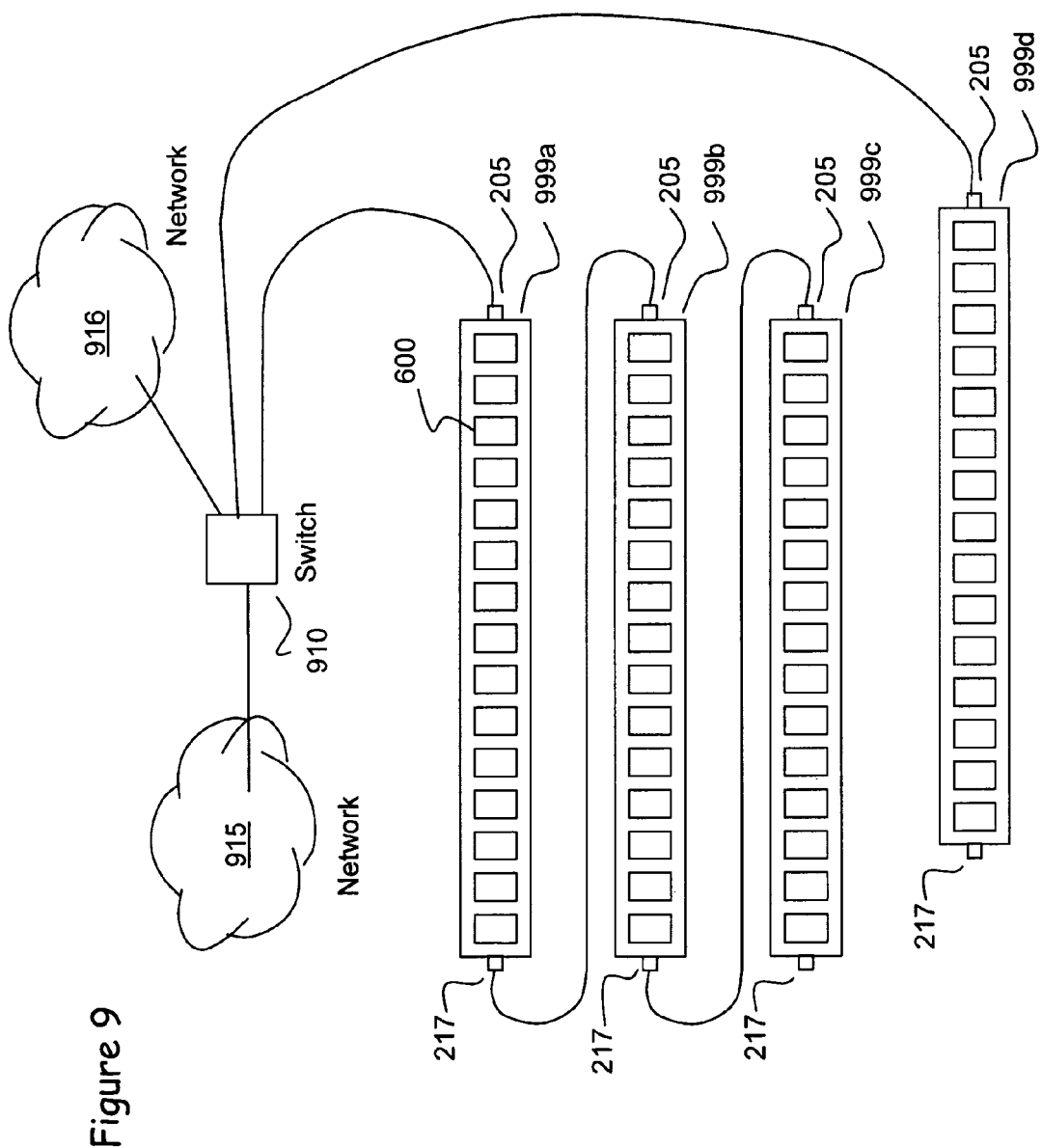
FIG. 9 illustrates the use of peripheral arrays connected in series and in parallel.

Using the input/output ports and bypass output ports located on the RF network control modules, multiple peripheral array units can be connected together in various configurations. Thus, such a peripheral array provides, in one application, a suitable tool in developing flexible and economical RF network architectures. FIG. 9. shows an example of four peripheral arrays arranged in a network in a series-parallel fashion. Shown in the figure are the peripheral arrays 899a-899d, peripheral devices (antennas built into the peripheral array enclosure in this case) 600, RF input ports 205, bypass output ports 218, an external network switch 910, and two parts of a computer network 915 and 916, which may include devices such as readers and computers (not shown), which themselves are connected to regions of a local area network or the general internet (world-wide web, not shown). In FIG. 9, three of the peripheral arrays 999a, 999b, 999c are connected in series (with one bypass output 217 connected to the RF input 205 of the next peripheral array in the chain), and the fourth peripheral array 999d is connected in parallel, taking advantage of the multiple ports on the external switch 910. The control of the external switch 910 is not shown explicitly in FIG. 9, but this could be accomplished using a separate control data line (not shown in figure) coupled between the external switch and whatever device in the network 915/916 is controlling it, or in another embodiment it could be done by enabling at least some of the ports on the switch to carry both traffic RF signals and RF controller command signals via a common port, as is done with the ports on the RF network control module and peripheral array of the illustrated embodiments.

Figure 10:
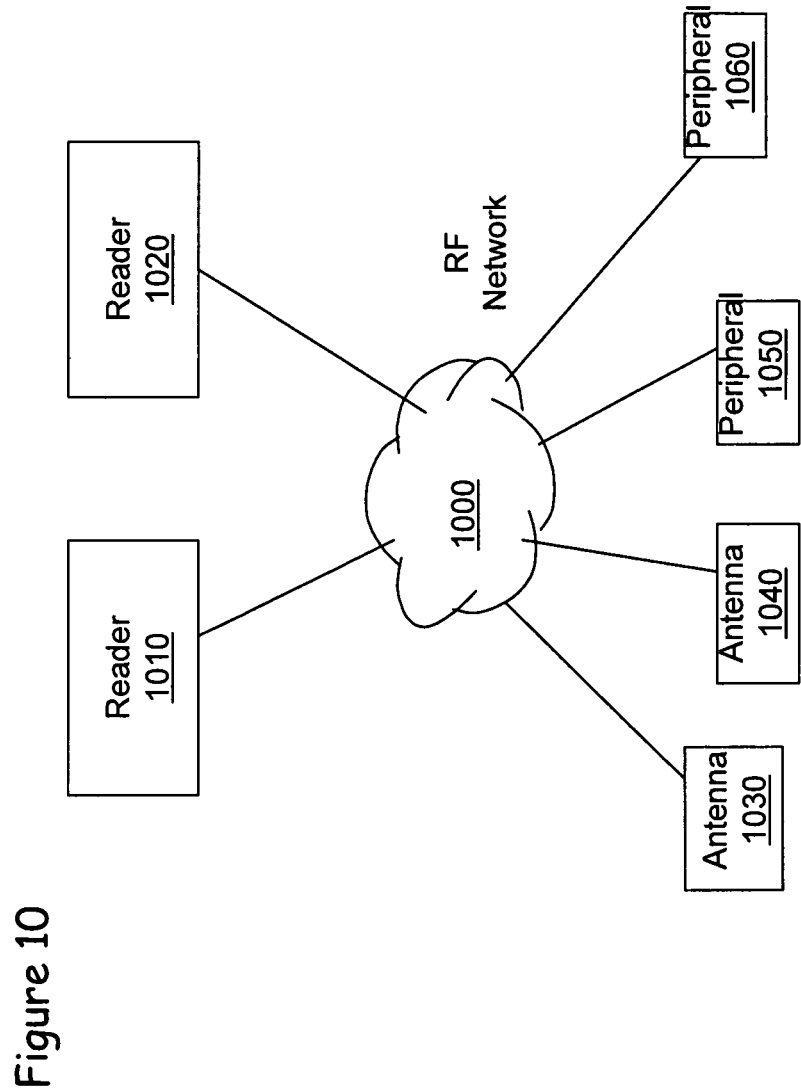
FIG. 10 illustrates one example in which two readers are in communication with antennas and peripheral devices via an enabling RF network.

RF network control modules and peripheral arrays making use of embodiments of the invention, in its various embodiments, can be a powerful tool in creating flexible RF networks which exhibit the desirable characteristics of fault tolerance (resilience to local device failure), and load-balancing capabilities. This is possible because the embodiments of the invention, along with devices such as combination (RF and data) routers and smart switches (previously described in U.S. Provisional Patent Application No. 60/657,709, filed Mar. 3, 2005 and Provisional Patent Application No. 60/673,757, filed Apr. 22, 2005, each of which is incorporated by reference herein in its entirety), allow the creation of a network in which the antennas and other peripheral devices have been abstracted from the RFID readers and network control devices. FIG. 10 illustrates one example in which two readers 1010 and 1020 are in communication with antennas 1030 and 1040, and peripheral devices 1050 and 1060 via an enabling RF network. Such an RF network can make it possible for either reader to communicate with either antenna, or any other antenna connected to the network, and also other peripheral devices using appropriate communications protocols. For example, while reader 1010 is communicating with antenna 1040, reader 1020 may be simultaneously communicating with antenna 1030. Also, each of the peripheral devices may communicate with either reader, or with each other, depending on the internal capabilities of those peripherals, using the enabling RF network. Also, if one of the readers fails, the other reader can support any and all of the antennas and peripheral devices so that basic application requirements are still met.

It should be noted that additional readers and many more antennas and other peripheral devices could be added to the RF network to greatly increase the permutations of communication scenarios. In an RF network like that shown in FIG. 10 the readers are viewed as network resources to be pulled into service as needed. In certain embodiments, there is no discrete and pre-determined assignment of specific groups of antennas to specific readers, as in the prior art. Such a network allows for the possibility of balancing loads on these resources (i.e., readers' assignments change from time to time as different parts of the network become more or less busy). Also, if the enabling RF network has the capability of detecting failures of readers or of devices inside the network, then the multi-path (redundant route) nature of the RF network enabled by embodiments of the invention and previously described devices makes it possible to create a robust (fault tolerant) RF communications system in which the applications do not fail simply because of a failure of a device in the network.

Figure 11:
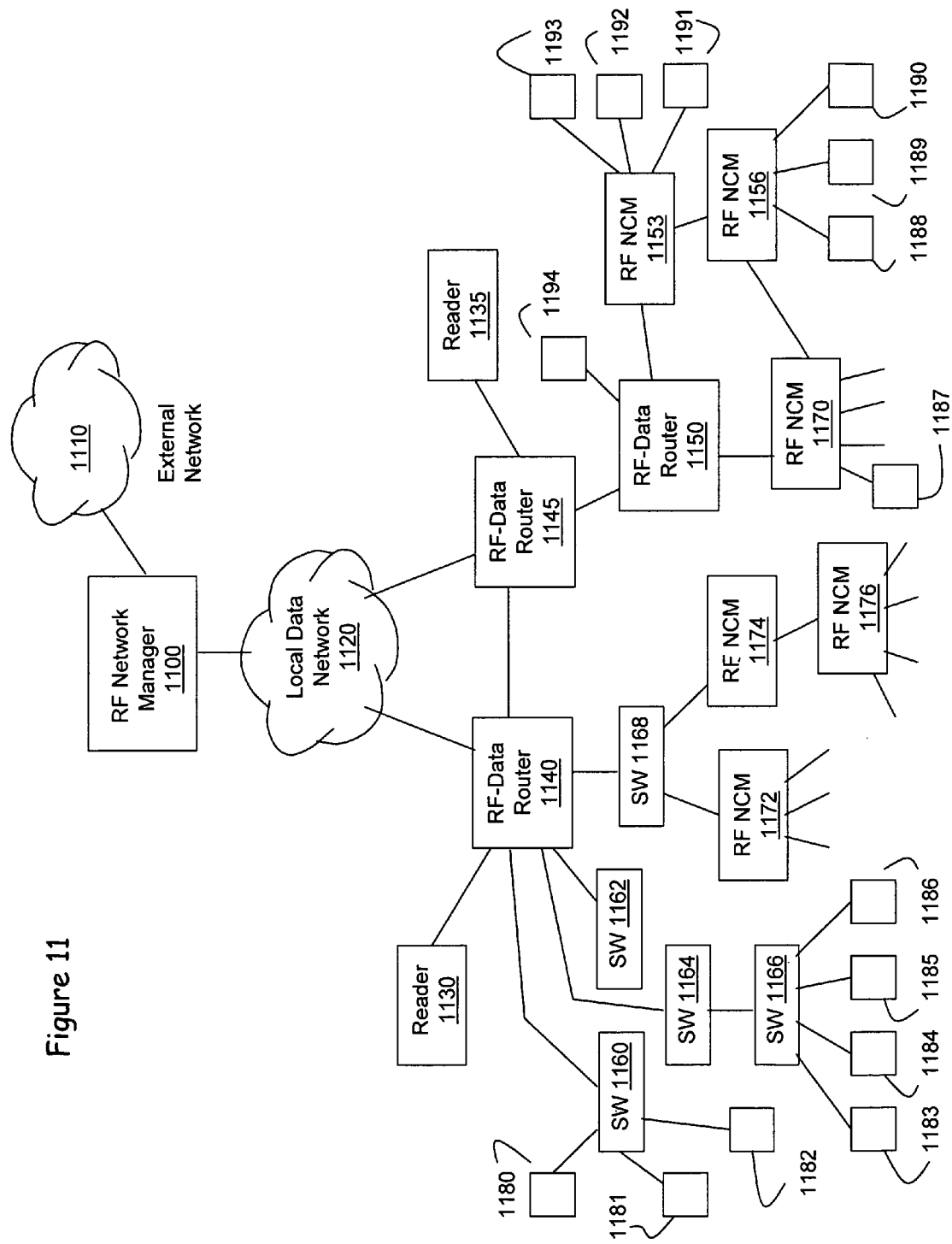
FIG. 11 illustrates one example of an enabling RF network.

FIG. 11 illustrates one example of the enabling RF network described above, based on embodiments of the invention and on the combination (RF and data) routers and smart switches previously disclosed. This particular network uses an RF network manager (software module) 1100 located between the external data network 1110 and the local data network 1120. A key architectural feature of the RF network in FIG. 11 is the use of two combination (RF and data) routers 1140 and 1145 which are connected to the local data network and to each other via an RF path. Each combination router also has its own attached reader, 1130 and 1135, respectively. In the network layers below the routers are various devices including other combination routers, smart switches, RF network control modules, and antennas. The network could also be configured to have the RF network control module as the layer 1 device with an attached reader unit (e.g., the RF network control module could be used in place of device 1145).

FIG. 11 is only one example of an RF network. A very large variety of architectures exists with which a given set of network devices can be connected, especially as the network grows in size (i.e., grows in the number of devices included in the network). No effort is made here to enumerate those architectures since they are well known in the prior art related to data networking.

FIG. 11 can be used to demonstrate a number of the features of a robust RF network. For example, the RF network manager 1100 can read the RFID tags in the area around antenna 1184 by using reader 1130 and a path between router 1140, switch 1164, and switch 1166. Alternatively, the RF network manager can read those same tags around antenna 1184 by using reader 1135 and the path running through router 1145, router 1140, switch 1164, and switch 1166. It can be similarly shown that all of the antennas in FIG. 11 (from antenna 1180 through and including antenna 1194) can be read using either of the two readers, and an appropriate path through the routers, switches, and RF network control modules. Also, it is possible to simultaneously read one antenna using one reader, and another antenna using the other reader. Thus, it is shown here that the current invention can enable network architectures which tolerate reader failures without a failure of the network itself, and by proper retasking of readers through the network, all antennas may still be monitored.

FIG. 11 shows a number of connectivity scenarios for the various network devices. For example, some smart switches are connected to a combination router in parallel (e.g., switches 1160, 1162, and 1164), while other switches are connected in series (e.g., switches 1164 and 1166). Similarly RF network control modules can be connected directly to combination routers (e.g., RF NCM 1153 and RF NCM 1170 attached to router 1150), or RF network control modules can be connected to smart switches (e.g., RF NCM 1172 and RF NCM 1174 on SW 1168). Also, RF network control modules can be connected to each other using the bypass ports as described in embodiments of the invention (e.g., RF NCM 1176 on RF NCM 1174, and also RF NCM 1156 attached to RF NCM 1153). RF Network control modules can also be connected to each other using any of their available ports as described in embodiments of the invention (e.g., RF NCM 1156 is attached to both RF NCM 1153 and RF NCM 1170).

In certain embodiments of the invention, the devices in the RF network, including combination routers, smart switches, and RF network control modules (and/or peripheral arrays), each have the capability of communicating with each other over the RF pathways between them using, for example, voltage levels (e.g., TTL logic) or RF communications as described previously herein. In this way, each device can determine the device numbers (identification or serial numbers) of each device connected to it over an RF link. This then allows each device to inform the RF network manager about its local connectivity state, and in this way the RF network manager can easily create and maintain a description of the network topology.

FIG. 11 illustrates a relatively simple multi-path network. More elaborate mesh networks can be envisioned which use the same types of RF networking devices together to create much greater redundancy, fault tolerance, and load balancing options.

FIG. 11 also provides a glimpse of the scalability advantages of the RF networking methods enabled by embodiments of the invention. For instance, in one embodiment the combination routers have eight input/output ports, the smart switches have one input and sixteen output ports, and the RF network control modules each support 15 antennas and a bypass using a single input port. In such a case it is easy to see that with only a few network layers and a handful of networking devices it is possible to address many (e.g., hundreds to thousands of) RFID antennas using only two readers.

Figure 12:
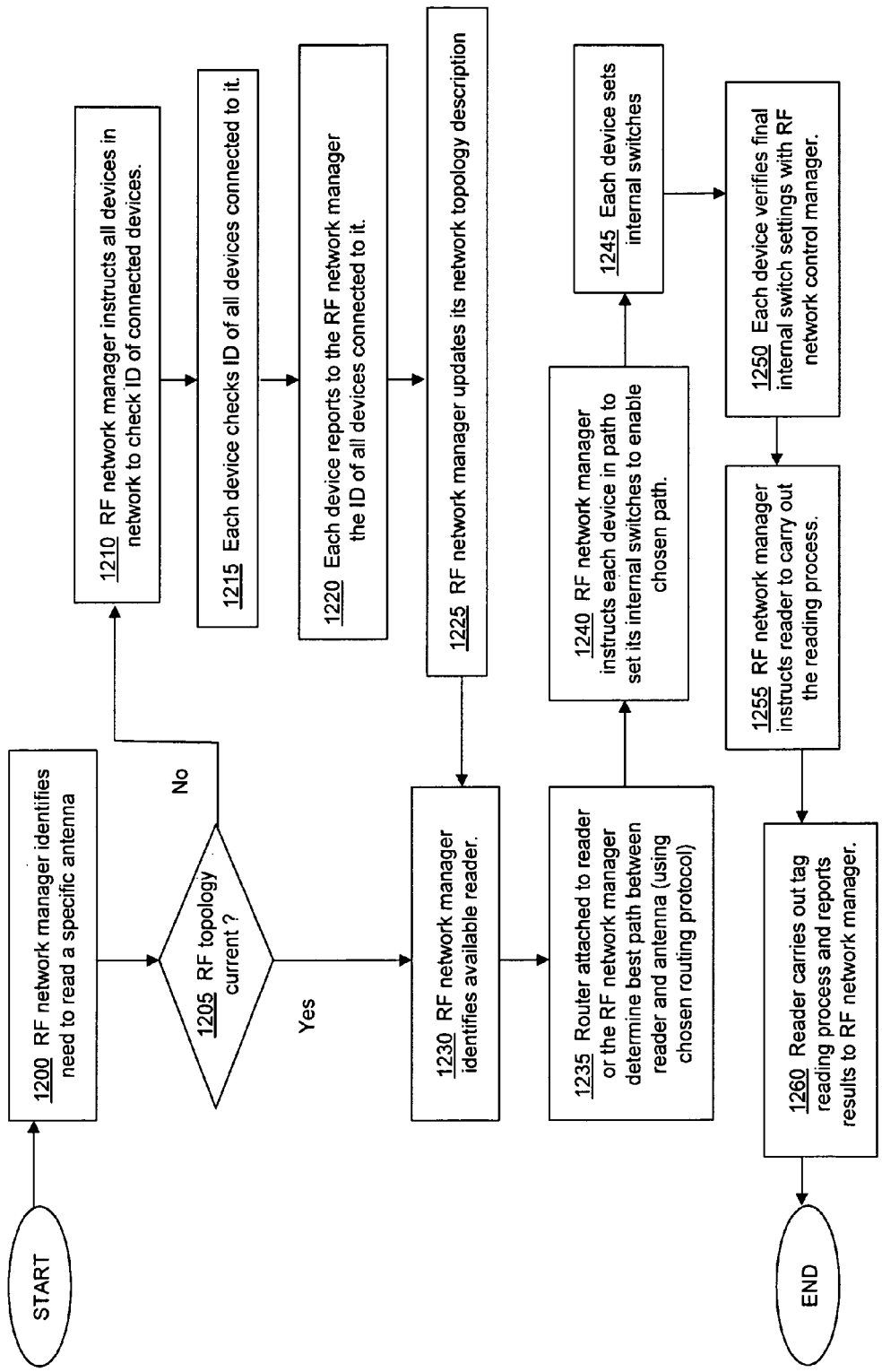
FIG. 12 illustrates operations by which an RF network manager uses a network to collect RFID data and/or other information, in accordance with one embodiment of the description provided herein.

FIG. 12 illustrates operations by which the RF network manager uses the network to collect RFID data and/or other information, including pathway selection and setup for the existing RF network topology, in accordance with one embodiment of the description provided herein. In block 1200 the RF network manager, for example, under direction from another software application operating in the local or extended network, determines to read the RFID tags within the communications range of a specific antenna in the network. In block 1205 the RF network manager checks to see whether its description of the network topology (connectivity among and between the devices comprising the network) is current. It may do this by checking a time schedule, checking the status of connectivity change indicators previously received, or a number of other means. In blocks 1210, 1215, 1220, and 1225, the devices in the network each determine the identity of the other devices with which they are connected, and then report these neighbor IDs to the RF network manager, which then updates its tables describing the network topology. Note that, as an alternative to performing blocks 1205 through 1225, the firmware in each network device can be programmed to report changes in local connects immediately after they occur (e.g., existing connections broken, or new connections formed). In such a case it is no longer necessary to perform steps 1205 through 1225, and one can proceed to step 1230 directly from step 1200.

In block 1230 of FIG. 12 the RF network manager determines which reader should be used to accomplish the tag reading process, based on various criteria including reader availability, reader proximity to the chosen antenna, reader type, and any other relevant circumstance. In block 1235, an optimum path between the chosen antenna and reader is chosen based on some standard or proprietary routing protocol (e.g., Open Shortest Path First (OSPF) or Routing Information Protocol (RIP)) that is based on criteria such as reader availability, reader proximity, reader type, number of RF hops (e.g., devices) required to complete the path between the reader and the antenna, etc. This can be done either within the processing unit of the combination router to which the reader is attached, or inside the RF network manager, or within any other device having some supervisory function in the network. In blocks 1240, 1245, and 1250, the RF network manager instructs each device to set its internal switches in a manner appropriate for the chosen path between the reader and the antenna (with controller commands), and each device sets its internal switches accordingly. Then the RF network manager verifies that the path is ready for transmission (e.g., based on each device verifying final internal switch settings and/or device to device connectivity with the RF network control manager). In blocks 1255 and 1260 the reading process is carried out by the reader and the results are reported back to the RF network manager.

As is apparent in FIGS. 9, 10, and 11, embodiments in accordance with the descriptions of the current and previously disclosed inventions are applicable to a variety of applications. In some applications, one or more of a reduction in cabling, simplification of network installation and maintenance, and reduction in network capital, installation, and maintenance cost may be facilitated. Note that, in the particular example of FIG. 9, each peripheral array has fifteen antennas 600, yielding sixty antennas overall across the four peripheral arrays 999a-999d. Any one of these antennas can be selected and used by an RFID reader or other transmitter-receiver located in the network 915/916. Furthermore, by utilizing the peripheral array features described herein, this functionality can be achieved using a reduced number of connecting cables, depending upon the particular application.

In applications in which more than one network control module is series or parallel connected, each module may have associated with it a unique address which may be used to determine if a received command was intended for it. The unique address may take the form of a unique bit pattern of appropriate length to distinguish each module. For example, providing a 48 bit pattern as a unique ID would as a practical matter, allow every module to potentially have a unique address, even with respect to modules in other networks.

There may be some situations in which it may be useful to place an application-specific RF transmitter receiver (transceiver), such as the transceiver 640 inside of controller 620 (FIG. 6), of a peripheral array or RF network control module as described herein. For example, in a network dominated by one type of RFID reader and communications protocol (e.g., RFID at UHF frequencies in the range of 860 MHz to 920 MHz), it may be appropriate in a particular spot in the network to support a different RFID reader and protocol (e.g., 13.56 MHz RFID). Perhaps in another place in the UHF RFID network it would be appropriate to support peripheral devices designed to communicate via a 13.56 MHz near-field-coupling protocol with handheld devices such as smart cell phones or Personal Data Assistants (PDAs). In another aspect of the present description, one way to support such local exceptions to the prevailing network's RF protocol, is to include a special transceiver 640 inside of the RF network control module or peripheral array which can communicate either directly with the external network (via the RF network control module input port or the peripheral array input port) or alternatively with the controller of the RF network control module or peripheral array, which is itself in communication with the network through the RF input. In the example of the UHF prevailing network with a 13.56 MHz local RFID application, the special transceiver would receive UHF signals (with the appropriate modulation and data encoding approach) from the network, and then would convert these into digital commands and data in the way most transceivers do demodulation, data extraction, and conversion (well known to those skilled in the art). The transceiver would then generate appropriate commands at the 13.56 Mhz frequency (with modulation and data encoding approaches appropriate to the local RFID communications protocol). In the embodiment in which the special transceiver interfaces with the peripheral array's controller rather than directly with the external network, the special transceiver may, in one embodiment, be a relatively simple device using a digital interface with the controller, and may reduce or eliminate UHF-to-digital conversion features. Such a transceiver may be characterized herein as an RFID "translator" which can convert between different frequencies, different modulation approaches, different data encoding approaches, and/or other communications protocol features in order to allow a special type of RF device to communicate with a network operating with a different RF communications protocol.

Note that the transceiver can include memory and program modules which allow it to implement time delays, aggregate data, implement time-smoothing of data, or delay a data transmission (e.g., to wait for restoration of network operation in the case of a general network failure).

In order to facilitate communication with the network to which they are connected, RF network control modules and/or peripheral arrays may be configured to perform an automatic exchange of key parameters, settings, state descriptions, or other information with additional devices on the network upon connection to the network. Such an exchange is particularly useful with other devices on the network which have some management responsibility over the RF network control module or peripheral array. For example, if a peripheral array is connected (via its RF input port) to an RF network and a program running on a server connected to the same network is to manage the peripheral array, it may be desirable to enable the program running on the server and the firmware in the peripheral array's controller to exchange MAC identification numbers, network IDs, logical (user-supplied) device names or codes, processor model numbers, peripheral type IDs and numbers of peripherals attached, power requirements, reset or power cycle commands, power threshold values, and various other state and capability descriptions. It is contemplated that further embodiments of the present invention may include such capabilities. In one embodiment, the firmware inside the controller of the RF network control module or peripheral array may be capable of exchanging similar state description parameters with peripheral devices when those devices are newly attached. Also, when a peripheral device is removed (detached) from the peripheral array, the controller of the peripheral array may be provided the capability to notify management devices on the network regarding the peripheral detachment, including its ID, location (port of last connection), time of detachment, and other key pieces of information, thereby providing a type of "plug and play" capability to the overall system.

Figure 13:
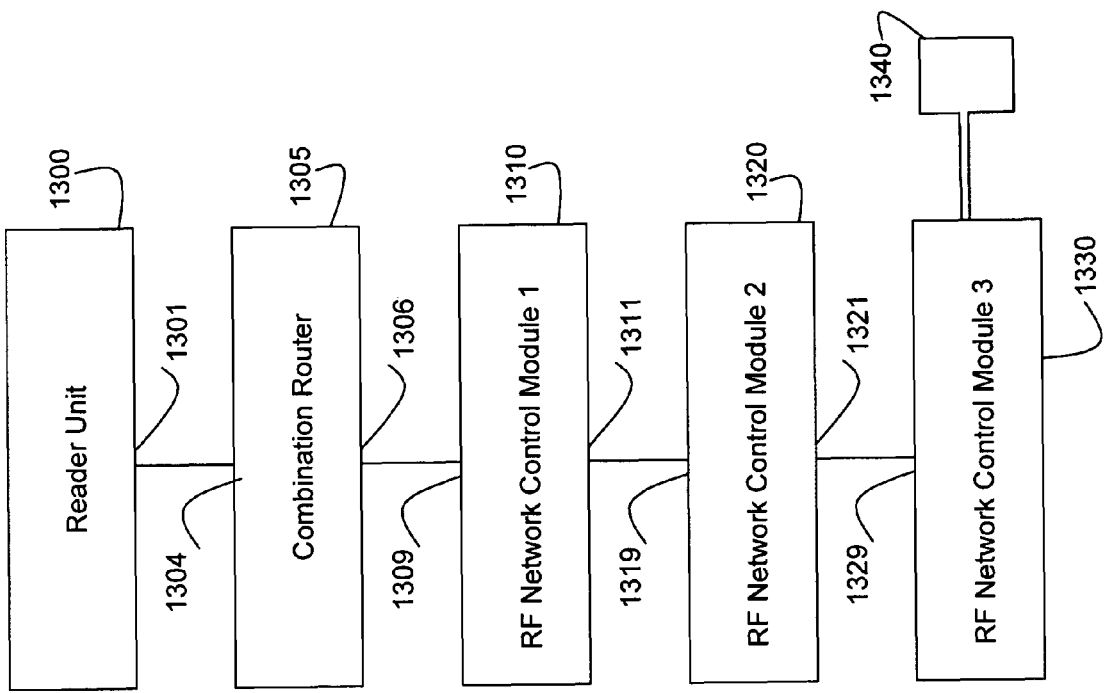
FIG. 13 illustrates an RF network control module in a network comprised of 3 layers of RF network control modules, in accordance with one embodiment of the description provided herein.

As described previously herein, the RF network control module may be utilized in a network comprised of additional layers of RF network control modules and other devices as shown in FIG. 11. FIG. 13 illustrates the RF network control module in a network comprised of 3 layers of RF network control modules. A reader unit 1300 is connected to a combination (RF and data) router 1305, such as the "IntelliRouter" described in U.S. Provisional Patent Application Nos. 60/657,709 and 60/673,757. One of the output ports 1306 on the combination router is connected to the RF input port 1309 of the layer 1 RF network control module 1310. The RF input port 1319 of the layer 2 RF network control module 1320 is connected to an output port 1311 of the layer 1 RF network control module 1310. Also, the RF input port of the layer 3 RF network control module 1330 is connected to an output port of the layer 2 RF network control module 1320. An antenna 1340 is connected to an output port of the layer 3 RF network control module 1330. In this network it is desired to send the RF traffic signal from the reader unit 1300 to the antenna 1340 through the various RF network control modules. The control flow scheme to create the RF network path through the RF network devices may be dependent upon whether the RF network control devices contain a unique address that identifies that particular RF network control module or if the RF network control devices do not contain unique addresses. Both techniques are described below.

For the case where the devices contain a unique address the communications with the devices can occur through any of the means previously described herein for the detection and analysis of the controller commands. The devices communicate with each other to determine the RF network topology so that this information can be sent to the RF network management software. The neighbor detection may be slightly different depending on whether the RF network control module contains an on-board RF generator or if it is communicating to the combination router, or attached RF network control module, through reflective load modulation. Controller commands sent to the RF network control devices may be either broadcast messages or device specific messages. With broadcast messages, any RF network control module that receives the broadcast message may respond. For the device specific control messages, the RF network control module analyzes the control message and determines whether the message was meant for it by looking at the destination address contained within the control message. If the RF network control module is the destination device, then the RF network control module acts upon the control message, otherwise it will ignore the command.

For the case in which the RF network control modules do not contain an on-board RF generator, the combination router 905 communicates with each of the connected RF network control modules to determine the unique addresses of the devices and determine the RF network topology. The control flow is described below. The combination router sends a device discovery broadcast controller command to the attached RF network control module asking for it to return its unique ID number. The RF network control module returns the unique ID number to the combination router. The combination router, in return, sends a registration controller command to the RF network control module to tell the RF network control module that it has been registered. Once registered, the RF network control module does not respond to another discovery broadcast message, unless it has been reset. The combination router then sends a message to the layer one RF network control module requesting that it complete an RF path between its RF input port and each of its RF output ports, one by one. For each of these paths, the combination router then sends another discovery broadcast message to obtain the unique ID of any RF network control module which may be attached. If an RF network control module is attached to a particular output port then the combination router registers the connection in the same way in which it registered the connection of the layer 1 RF network control module. The combination router then uses the same sort of procedure to register the devices connected in the next layer, device by device and layer by layer. As described previously herein, the combination router relays this RF topology information to the RF network control software.

For the case in which the RF network control modules contain an on-board RF generator, the combination router can either determine the RF topology as just described or the RF network control devices can determine their nearest neighbors directly using an approach similar to the method described in U.S. Provisional Patent Application No. 60/673, 757, in which was described the use of baseband communications to detect the nearest neighbors and the RF topology. Instead of the baseband communication described in the previous patent application the RF network control modules may use the on-board RF generator and one of the communication protocols previously described herein to communicate their network topology to each other.

For the case in which the devices do not contain a unique address the communications with the devices can occur through one of the schemes previously described that is based on the RF power levels and one particular embodiment is shown in FIG. 13 and is described below. The RF network control modules have been configured to interpret any RF signal that is between a certain range as a control signal. For ease of illustration, the range of 4 dBm and 5 dBm as a control signal is used as an example. Also, if no RF path is currently configured on the RF network control module, then the module sends the RF power level measured by the on-board power detector to the combination router; the RF network control module also enters this state when it is powered up for the first time. To setup the communication path through the devices, the combination router outputs a high power signal (e.g. 28 dBm) to the layer 1 RF network control module's RF input port. Through one of the communication schemes previously described herein the RF network control module sends the RF power level as measured with the on-board power detector to the combination router. For this example, it is assumed that the measured power level was 25 dBm. The combination router can then determine that there is 3 dB of loss in the system and it can adjust its output power to 7.5 dBm so that it can communicate with the first layer device (i.e. with an output power level of 7.5 dBm and system loss of 3 dB the signal observed at the layer one device will be 4.5 dBm and the communication will therefore be interpreted as a command signal by the layer one device). Losses in the system are such that there will be a few dB of loss due to cable lengths, connectors, and other components in the path. The combination router can communicate to the layer one RF network control module and instruct it to complete a path between its RF input port and its RF output port which is connected to the layer 2 RF network control module. This now completes a path to the layer 2 RF network control module. The combination router can now output a high level signal as before, and the layer 2 RF network control module sends the RF power level observed at the layer 2 RF network control module to the combination router. The combination router can now determine the RF power level that it must output in order to achieve a RF power level of 4.5 dBm at the layer 2 RF network control module just as it did for the layer 1 RF network control module. The combination router can then instruct the layer 2 RF network control module to complete an RF path from its RF input port 1319 to its output port 1321. The same process can be used to complete the RF path through the layer 3 device. The RF network management software can now instruct the reader to perform a read event (at, for example, antenna 1340) and it can analyze the collected data. The combination router can then destroy the RF path that was created by cycling the power to the RF network control manager devices causing them to go into the power up control state. Subsequently the process can then repeated to create a new RF path through the RF network control module network.

Figure 14:
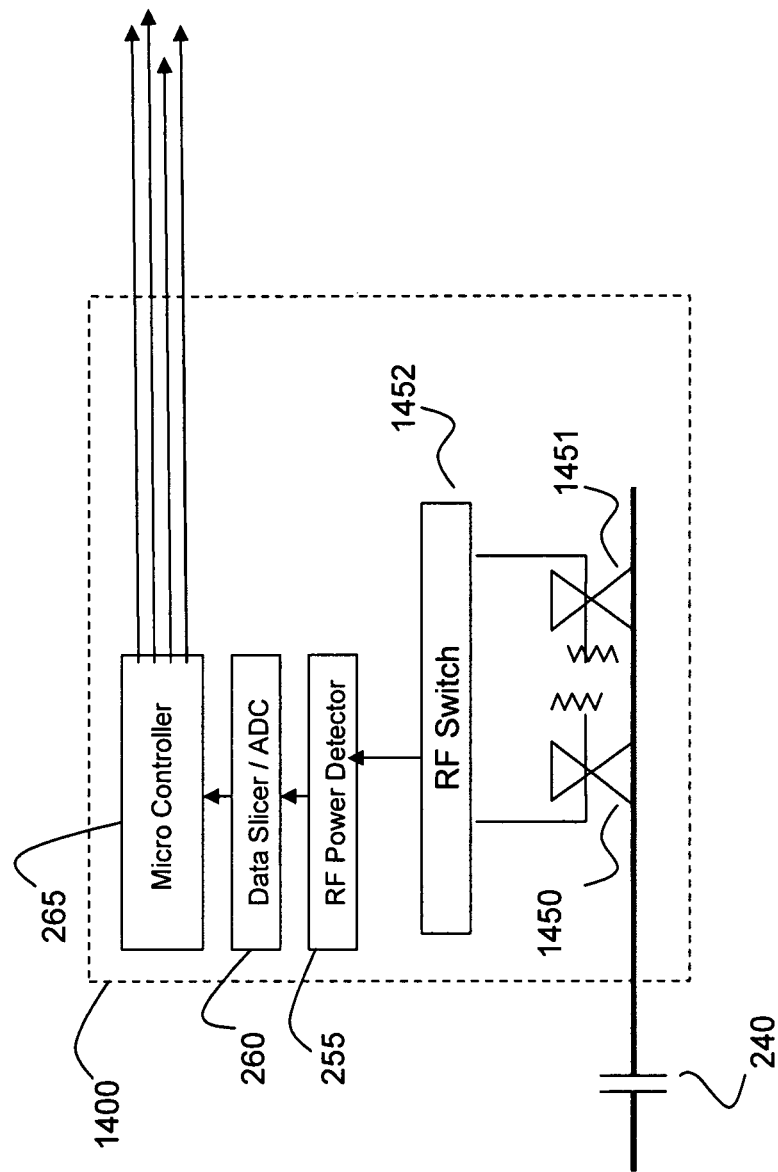
FIG. 14 illustrates one embodiment of an RF network control module's controller, showing one example of a circuit suitable for measurement of a connected antenna's voltage-standing-wave ratio (VSWR).

In another embodiment, the RF network control module contains circuitry enabling a voltage-standing wave ratio (VSWR) of an attached antenna to be determined for antenna health monitoring and diagnostics or for the diagnostics on the connection from the RF network control module port to an attached peripheral device. FIG. 14 illustrates an RF network control module in accordance with yet another embodiment of the description provided herein. Controller 1400 includes a VSWR detection circuit. The VSWR detection circuit consists of an RF power detector 255 (e.g., a Linear Technology LT5537 product available from Linear Technology Corporation), an RF switch 1452 (e.g., a Skyworks AS179-92 product available from Skyworks Solutions, Inc.), and two directional couplers 1450 and 1451 (e.g., DC09-73 available from Skyworks Solutions, Inc.). The two directional couplers 1450 and 1451 could be replaced with a dual-directional coupler. The VSWR measurement is accomplished through the following process when using a single-channel RF power detector (e.g., LT5537). Once the desired port has been enabled by the RF network control module, the host system sends a command to the RF network control module instructing the RF network control module to measure the VSWR. The host then transmits an RF signal at the desired frequency, and the RF network control module sets switch 1452 so that directional coupler 1450 is connected to the RF power detector. The RF network control module measures the RF power level of the signal from the host system. The RF network control module then enables switch 1452 to connect directional coupler 1451 to the RF power detector. The power level of the reflected signal is measured. The RF network control module then calculates the VSWR from the measured transmitted and reflected power levels. The VSWR is then transmitted to the host system through a communication means as described previously herein. In addition, the measured power levels could be sent to the host system. The order of the steps utilized in the VSWR measurement could be varied as would be apparent to one skilled in the art. If a dual-channel RF power detector is utilized (e.g. a Maxim MAX2016 product available from Maxim Integrated Products, Inc.) the RF switch 1452 could be eliminated and the transmitted and reflected power levels could be determined at the same time. If the RF network control module contains an on-board RF generator then it can determine the antenna VSWR directly by transmitting a RF signal of a know RF power level using the on-board RF generator and measuring the reflected RF power levels.

Figure 15:
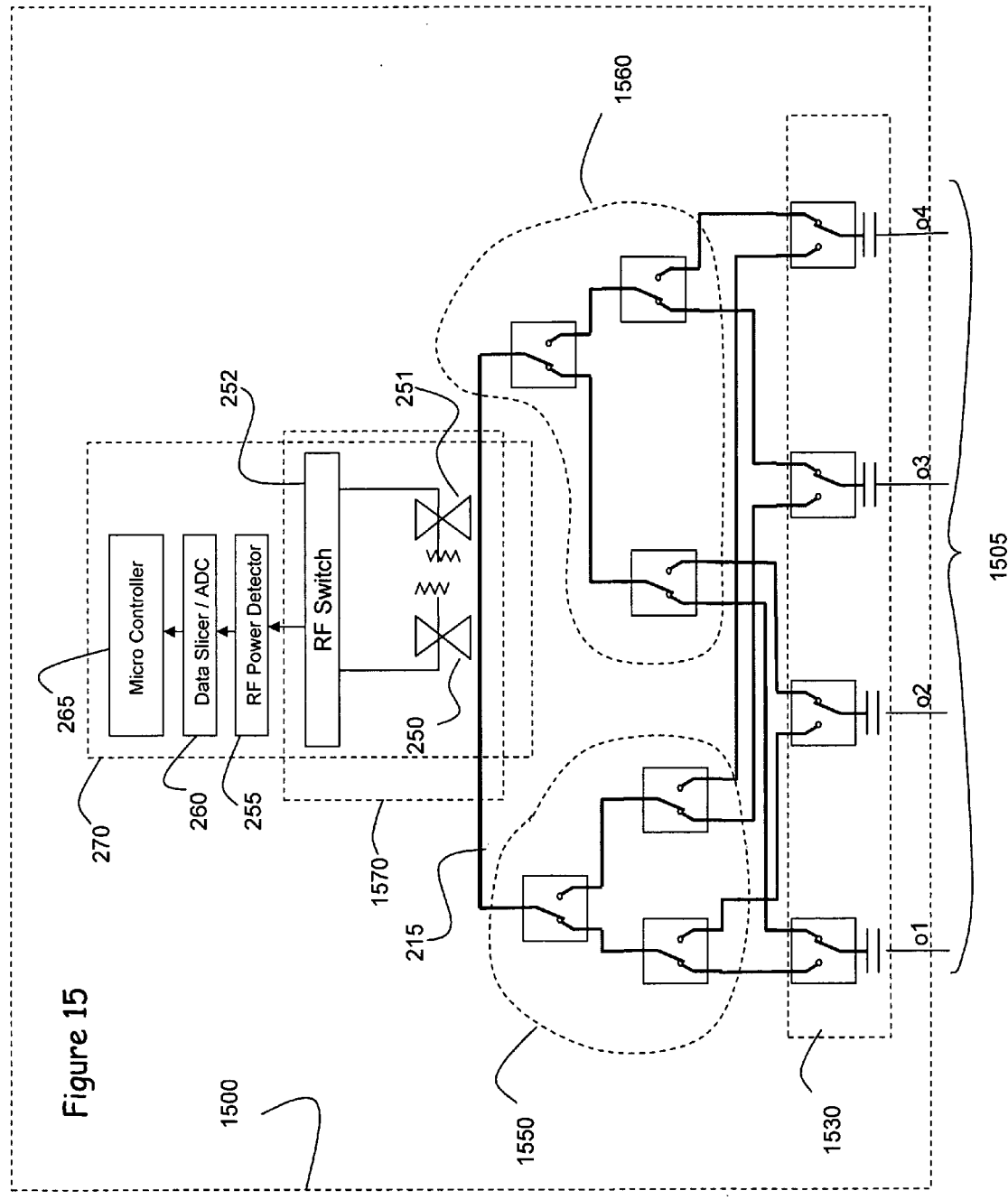
FIG. 15 illustrates one embodiment of an RF network control module with four identical ports, wherein each port is capable of conveying traffic signals, command signals, power, or any other AC or DC logic signal, and whereby any port is capable of being connected internally to any other port by proper action of switches.

In one embodiment, all ports on the network control module are functionally equivalent in that each of the ports is able to both input and output any or all traffic signals, controller command signals, and power signals. In this configuration, an electrically connected communication path can be created inside the RF network control module between any two ports. This embodiment is illustrated in FIG. 15. For illustrative purposes the RF network control module 1500 depicted in FIG. 15 contains only four ports but this is not meant to be limiting and it could be expanded to any number of ports as would be apparent to one skilled in the art. As depicted in FIG. 15 in accordance with one embodiment of the present invention, components of the RF network control module 1500 include a series of ports 1505 (labeled o1 to o4), a first internal switch network 1550, a main conductive or communication path 215, a port switch network 1530, and a second internal switch network 1560. The internal switch networks as drawn allow any port to be connected to any other port through communication path 215. In certain embodiments of the invention, one communication path through the RF network control module is active at a time; however, in certain alternative embodiments, as would be apparent to one skilled in the art, the internal switch networks can be modified to allow for a plurality of communication paths to be active at a given time, allowing for a plurality of port to port communication paths (i.e., o1 to o2 and simultaneously o3 to o4, with o1 to o2 communication path isolated from o3 to o4).

In this embodiment of the invention, the micro controller 265 uses the first internal RF switch network 1550 and the port switch network 1530 to scan through each port listening for a control command. If a control command is received, then the RF network control module responds as appropriate. For example, one operational scenario may be the following: 1) the RF network control module scans through each port by setting the appropriate switches in internal networks 1530 and 1550 looking for a control command; 2) the RF network control module receives a control command on port o2 (in this example) that instructs it to create a communication path to port o4; 3) the RF network control module sets the appropriate switches in the second internal switch network 1560 and port switch network 1530 that creates a communication path between ports o2 and o4.

In a further embodiment, the RF network control module could have the RF power detection circuitry 1570 located at each port rather than as illustrated in FIG. 15. In this configuration the microcontroller could cycle through monitoring of each port for control commands or the system could be designed, as would be apparent to one skilled in the art, to simultaneously monitor all of the ports for control commands. In other configurations, the RF power detection circuitry 1570 could be leveraged across multiple ports.

As previously described herein, the RF network control module can contain an internal transceiver that can be used to communicate with attached peripheral devices or other RF network control modules.

In certain embodiments, one or more of the ports can be configured to operate as bypass ports. In certain embodiments, one or more module bypass ports may be present.

While the RF network control module has been described in its various embodiments as a device which may be coupled to one or more remote devices using external cable connections via its common and ports (i.e., in that a port may act as an input port or an output port), it is appreciated that the RF network control module may additionally or alternatively be included or embedded within other devices. By way of example, and without limitation, the RF network control module in any of its described embodiments may thus be incorporated within RFID readers, access points, standard router or switch devices, appliances for management of an RFID data collection network, or other communication-oriented or computing peripherals in further embodiments of the invention. Embodiments wherein one or more RF network control modules is/are embedded within another device to form a hybrid device is therefore expressly contemplated as being within the scope of the invention.

It should also be noted that none of the embodiments described above are intended to limit the scope of the invention with respect to physical form factors of electronic components. The conductors connected to ports and forming electrically connected communication paths may be in the form of coaxial cable, shielded cable, twisted wire pairs (UTPs), and etched traces or transmission lines on printed circuit boards.

The foregoing description of various embodiments has been presented for the purposes of illustration. It is not intended to be exhaustive or to limit to the precise form disclosed. Many modifications and variations are possible in light of the above teaching.

What is claimed is:

1. A device, comprising: a plurality of ports adapted to convey traffic signals, wherein at least one of said plurality of ports is adapted to convey traffic signals and command signals;
- a switch network having a plurality of inverters, switches and conductive paths:
- the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals between a pair of ports, wherein at least one port of said pair of ports is adapted to convey traffic signals and command signals; and
- a controller adapted to receive traffic signals and command signals from said at least one of said plurality of ports, and to decode said command signals and control said switches to provide said electrically connected communication path between said pair of ports in response to a decoded command signal, wherein a traffic signal is conveyed between said pair of ports via said controller.

2. The device of claim 1, wherein only one port of said plurality of ports is adapted to convey traffic signals and command signals.

3. The device of claim 1, wherein each port in said plurality of ports is adapted for coupling with an electrical conduit comprised of two separate electrical conductors.

4. The device of claim 3, wherein the electrical conduit is comprised of a coaxial cable.

5. The device of claim 1, for use with a radio frequency identification (RFID) transponder wherein said traffic signals are RFID traffic signals, said device further comprising,
- an antenna coupled to a selected port and adapted to transmit said RFID traffic signals by at least one of electromagnetic radiation, inductively coupled signals, and capacitively coupled signals from said antenna coupled to said selected port to an RFID transponder; and receive at said antenna a responsive signal from said RFID transponder in response to said radiation or signals transmitted by said antenna to provide a return RFID traffic signal, wherein said device is capable of directing a return RFID traffic signal from said selected port holding said antenna, along said electrically connected communication path, and to said port adapted to convey traffic signals and command signals.

6. The device of claim 5, further comprising:
- circuitry adapted to determine a voltage-standing wave ratio (VSWR) of said antenna.

7. The device of claim 1, for use with a radio frequency identification (RFID) transponder wherein said traffic signals are RFID traffic signals, said device further comprising,
- a first antenna coupled to a selected first port and adapted to transmit said RFID traffic signals by at least one of electromagnetic radiation, inductively coupled signal, and capacitively coupled signal from said first antenna coupled to said selected first port, to an RFID transponder; and
- a second antenna coupled to a selected second port and adapted to receive at said second antenna a responsive signal generated by said RFID transponder in response to at least one of electromagnetic radiation, inductively coupled signal, and capacitively coupled signal from said first antenna to provide a return RFID traffic signal wherein said device is capable of directing said return RFID traffic signal from said selected second port, along said electrically connected communication path, and to said port adapted to convey traffic signals and command signals.

8. The device of claim 1, wherein said traffic signals include traffic signals having a power level of at least 5 dBm.

9. The device of claim 1, wherein said traffic signals include traffic signals having a power level below 5 dBm.

10. The device of claim 1, wherein said command signals are encoded in a radio frequency (RF) signal as a function of the RF power level of the RF signal and said controller comprises an RF power level detector adapted to detect the power level of a received RF signal.

11. The device of claim 10, wherein said RF power level detector is adapted to provide a digital signal as a function of the RF power level of a received RF signal.

12. The device of claim 10, wherein said controller further comprises an analog-to-digital converter adapted to provide a digital signal as a function of the analog signal provided by the RF power level detector.

13. The device of claim 10, wherein said controller is adapted to distinguish, as a function of said detected RF power level of a received RF signal, between command signals intended for said controller of said device and RF traffic signals intended to be directed on an electrically connected RF communication path between selected ports.

14. The device of claim 13, wherein said controller is adapted to identify command signals encoded in RF signals and intended for said controller of said device when said detected RF power level of a received RF signal is below a predetermined threshold power value, and identify RF traffic signals intended to be directed on said electrically connected RF communication path between selected ports, when said detected RF power level of a received RF signal exceeds said predetermined threshold power value.

15. The device of claim 14, wherein said controller is adapted to identify command signals encoded in RF signals and intended for said controller of said device when said detected RF power level of a received RF signal falls within a predetermined power level range, and identify RF traffic signals intended to be directed on said electrically connected RF communication path between selected ports, when said detected RF power level of a received RF signal falls outside of said predetermined power level range.

16. The device of claim 1, wherein said command signals are digitally encoded in radio frequency (RF) signals and said command signals include a sequence of bit values corresponding to a predetermined start-frame command and a sequence of bit values corresponding to a predetermined end-frame command, wherein said controller is adapted to distinguish between command signals intended for said controller of said device, and RF traffic signals intended to be directed on said electrically connected RF communication path between selected ports, wherein said distinguishing includes recognizing said sequence of bit values corresponding to a predetermined start-frame command to initiate identification of command signals intended for a controller of said device, and recognizing said sequence of bit values corresponding to a predetermined end-frame command to terminate identification of command signals intended for said controller of said device.

17. The device of claim 1, wherein said command signals are digitally encoded in radio frequency (RF) signals and said command signals include a sequence of bit values corresponding to a predetermined start-frame command and a sequence of bit values corresponding to a predetermined end-frame command, wherein said controller is adapted to distinguish between command signals intended for said controller of said device and RF traffic signals intended to be directed on said electrically connected RF communication path between selected ports, wherein said controller comprises an RF power level detector adapted to detect the power level of a received RF signal and wherein said distinguishing includes initiating identification of command signals intended for a controller of said device in response to recognizing said sequence of bit values corresponding to a predetermined start-frame command, and terminating identification of command signals intended for said controller of said device in response to at least one of recognizing said sequence of bit values corresponding to a predetermined end-frame command, and detecting an RF power level of a received RF signal exceeding a predetermined threshold power value.

18. The device of claim 1, wherein said command signals are digitally encoded in radio frequency (RF) signals and said command signals include a sequence of bit values corresponding to a predetermined start-frame command and a sequence of bit values corresponding to a predetermined end-frame command, wherein said controller is adapted to distinguish between command signals intended for said controller of said device and RF traffic signals intended to be directed on said electrically connected RF communication path between selected ports, wherein said controller comprises an RF power level detector adapted to detect the power level of a received RF signal and wherein said distinguishing includes initiating identification of command signals intended for a controller of said device in response to recognizing said sequence of bit values corresponding to a predetermined start-frame command, and terminating identification of command signals intended for said controller of said device in response to at least one of recognizing said sequence of bit values corresponding to a predetermined end-frame command, and' detecting an RF power level of a received RF signal falls within a predetermined power level range.

19. The device of claim 1, wherein said controller comprises a digital logic circuit.

20. The device of claim 1, wherein said controller comprises a field programmable gate array.

21. The device of claim 1, wherein said controller comprises a microcontroller.

22. The device of claim 1, wherein said command signals are encoded in radio frequency (RF) signals and said controller is adapted to be operated in response to a supply of power, and wherein said controller is adapted to distinguish between command signals intended for said controller of said device, and RF traffic signals intended to be directed on said electrically connected RF communication path between selected ports, wherein said distinguishing includes identifying RF signals as having command signals encoded in RF signals in response to a reduction of power supplied to said controller.

23. The device of claim 22, wherein said controller is adapted to be reset in response to said reduction of power supplied to said controller.

24. The device of claim 1, further comprising:
a first path containing a first filter adapted to filter RF signals to substantially block component signals having a frequency below a first predetermined cutoff frequency;
a second path containing a second filter adapted to filter RF signals to substantially block component signals having a frequency above a second predetermined cutoff frequency;
a bypass port; and
a summing node;
wherein said electrically connected communication path is coupled to said summing node via said first path containing said first filter, and wherein said port adapted to convey traffic signals and command signals is coupled to said summing node via said second path containing said second filter, and wherein said bypass port is coupled to said summing node.

25. The device of claim 24, wherein signals received at said port adapted to convey traffic signals and command signals have a direct current (DC) component, said device further comprising power supply circuitry adapted to supply power for said device as a function of said DC component.

26. The device of claim 1, further comprising:
a device bypass port; a device bypass switch; and
a bypass filter adapted to substantially pass RF signals, traffic signals, and control signals having a frequency at or above a predetermined cutoff frequency and to substantially block component signals having a frequency below said predetermined cutoff frequency;
wherein said port adapted to convey traffic signals and command signals is coupled to said device bypass switch via said bypass filter; and wherein said device bypass switch is coupled to said device bypass port, whereby said traffic signals and command signals input to said device can be conveyed to said bypass port by setting of said device bypass switch.

27. The device of claim 1, further comprising a circuit board supporting each of said conductive network switches and conductive paths and said controller on said circuit board.

28. The device of claim 1, further comprising an enclosure enclosing each of said conductive network switches and conductive paths and said controller within said enclosure.

29. The device of claim 1 further comprising a plurality of peripheral devices, each peripheral device being coupled to a port.

30. The device of claim 29, wherein at least one of said peripheral devices is an RF antenna.

31. The device of claim 1, wherein said device comprises a first device and wherein the first device is adapted to be included in a second device.

32. The device of claim 1, wherein said switch network is adapted to provide multiple communication paths active at a same time.

33. A network, comprising:
a first peripheral array having a first plurality of ports adapted to convey traffic signals, and wherein at least one of said first plurality of ports is adapted to convey traffic signals and command signals;
a first plurality of peripheral devices coupled to one or more of said ports of said first peripheral array;
a first switch network having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals between a pair of ports; a first controller adapted to receive traffic signals and command signals from said at least one of said plurality of ports, and to decode said command signals and control said switches to provide said electrically connected communication path between said pair of ports in response to a decoded command signal, wherein a traffic signal is conveyed between said pair of ports via said controller;
a bypass port and bypass switch whereby signals entering said peripheral array can be directed via said bypass switch to said bypass port;
a second peripheral array having a second plurality of ports adapted to convey traffic signals, and wherein at least one of said second plurality of ports is adapted to convey traffic signals and command signals;
a second plurality of peripheral devices coupled to said ports of second peripheral array;
a second switch network having a plurality of inverters, switches: and conductive paths, the plurality of inverters, switches, and conductive paths arranged in a cascading configuration, including at least two interconnected layers of the switches, adapted to selectively couple ports of said second plurality of ports to provide a second electrically connected communication path for traffic signals between a pair of ports of said second peripheral array; and
a second controller adapted to decode command signals and control said switches of second switch network to provide said second electrically connected communication path between said pair of ports in response to a decoded command signal, wherein a traffic signal may be conveyed between said pair of ports; and whereby a traffic signal from said bypass port of said first peripheral array may be directed to said second peripheral array, and may also be directed via said second electrically connected communication path of said second peripheral array to a peripheral device coupled to a port of said second peripheral array.

34. The network of claim 33, further comprising a network switch having a plurality of ports, wherein a port of said pair of ports of said electrically connected communication path of said first peripheral array is coupled to a first port of said network switch, and whereby traffic signals and command signals may be directed from said network switch via said first peripheral array and said bypass port of said first peripheral array, to a peripheral device coupled to a port on said second peripheral array.

35. The network of claim 34, further comprising:
a third peripheral array having a third plurality of ports adapted to convey traffic signals, and wherein at least one of said third plurality of ports is adapted to convey traffic signals and command signals and is coupled to a second port of said network switch; a third plurality of peripheral devices coupled to said ports of third peripheral array; a third switch network having switches and conductive paths adapted to selectively couple ports of said third plurality of ports to provide a third electrically connected communication path for traffic signals between a pair of ports of said third peripheral array; a third controller adapted to decode command signals and control said switches of third switch network to provide said third electrically connected communication path between said pair of ports in response to a decoded command signal, wherein a traffic signal may be conveyed between said pair of ports; and whereby a traffic signal from said network switch may be directed to a peripheral device coupled to a selected port of said third peripheral array and wherein said first and third peripheral arrays are parallel connected to said network switch.

36. The network of claim 34, wherein said network further comprising a transmitter/receiver coupled to a port of said network switch.

37. The network of claim 36, wherein said ports of said network switch are adapted to convey RF signals, and wherein said transmitter/receiver is a radio frequency identification (RFID) reader coupled to said network switch.

38. The network of claim 33, further comprising a radio frequency identification (RFID) reader and a computer adapted to pass commands to said reader and receive data from said reader, and wherein a port of said first peripheral array adapted to convey traffic signals and command signals is coupled to said reader.

39. The network of claim 33, for use with a radio frequency identification (RFID) transponder wherein said traffic signals are RFID traffic signals having a predetermined frequency range and a peripheral device of said first array is an antenna adapted to transmit said RFID traffic signals by at least one of electromagnetic radiation, inductively coupled signals, and capacitively coupled signals from said antenna to an RFID transponder and wherein said controller command signals are RF signals having a frequency range substantially the same as said RFID traffic signals.

40. The network of claim 33, for use with a radio frequency identification (RFID) transponder wherein said traffic signals are RFID traffic signals modulated in accordance with an RFID protocol, and a peripheral device of said first array is an antenna adapted to transmit said RFID traffic signals by at least one of electromagnetic radiation, inductively coupled signals, and capacitively coupled signals from said antenna to an RFID transponder and wherein said controller command signals are RF signals modulated in accordance with said RFID protocol.

41. The network of claim 33, for use with a radio frequency identification (RFID) transponder wherein said traffic signals are RFID traffic signals and include data encoded in accordance with an RFID protocol, and a peripheral device of said first array is an antenna adapted to transmit said RFID traffic signals by at least one of electromagnetic radiation, inductively coupled signal, and capacitively coupled signal from said antenna to an RFID transponder and wherein said controller command signals are RF signals encoded with data in accordance with said RFID protocol.

42. A method, comprising:
receiving signals which include traffic signals and command signals, conveyed by a common conductor, at a first port of a device adapted to convey said traffic signals and command signals;
receiving said traffic signals and command signals, from said first port, at a controller,
decoding command signals received at said first port;
in response to a decoded command signal, controlling selected switches of a plurality of switches associated with a switch network of said device by splitting components of the command signal with an inverter of a plurality of inverters and transmitting the split components through a cascading arrangement of the plurality of switches including at least two interconnected layers of the switches, each switch of the plurality of switches coupled to an inverter of the plurality of inverters, and each conductive path of a plurality of conductive paths assigned and coupled to a switch of said plurality of switches, each switch cooperatively controlled to couple said first port to a selected second port of said device to provide an electrically connected communication path between said first port and said selected second port;
forwarding traffic signals along said communication path via said controller; and
conveying traffic signals at said selected second port out of said device.

43. The method of claim 42, further comprising:
receiving at said selected second port return traffic signals in response to conveyed traffic signals;
forwarding return traffic signals along said electrically connected communication path; and
conveying at said first port, return traffic signals out of said device.

44. The method of claim 43, wherein said traffic signals and return traffic signals are radio frequency identification (RFID) traffic signals, said method further comprising,
transmitting said RFID traffic signals by at least one of electromagnetic radiation, inductively coupled signals, and capacitively coupled signals from an antenna coupled to said selected second port to an RFID transponder; and
receiving at said antenna a response signal from said RFID transponder in response to said radiation transmitted by said antenna.

45. The method of claim 42, wherein said traffic signals include traffic signals having a power level of at least 5 dBm.

46. The method of claim 42, wherein said traffic signals include traffic signals having a power level below 5 dBm.

47. The method of claim 42, wherein said command signals are encoded in a radio frequency (RF) signal as a function of RF power level and said decoding includes detecting the RF power level of a received RF signal.

48. The method of claim 47, wherein said decoding includes providing a digital signal as a function of the detected RF power level of a received RF signal.

49. The method of claim 47, wherein said decoding includes providing a digital signal as a function of the provided analog signal.

50. The method of claim 47, wherein said decoding includes distinguishing, as a function of said detected RF power level of a received RF signal, between command signals intended for a controller of said device and RF traffic signals intended to be directed to a selected port of said device to be output.

51. The method of claim 50, wherein said distinguishing includes identifying command signals encoded in RF signals intended for a controller of said device when said detected RF power level of a received RF signal falls within a predetermined power level range, and further includes identifying RF traffic signals intended to be directed to a selected port of said device to be output, when said detected RF power level of a received RF signal falls outside of said predetermined power level range.

52. The method of claim 42, wherein said decoding includes distinguishing between command signals encoded in RF signals intended for a controller of said device and RF traffic signals intended to be directed to a selected port of said device to be output.

53. The method of claim 52, wherein said distinguishing includes recognizing a sequence of bit values corresponding to a predetermined start-frame command to initiate identification of command signals intended for a controller of said device, and recognizing a sequence of bit values corresponding to a predetermined end-frame command to terminate identification of command signals intended for a controller of said device.

54. The method of claim 52, further comprising supplying power to operate said controller and reducing said supplied power to a predetermined level for an interval, wherein said distinguishing includes identifying RF signals as having encoded command signals in RF signals immediately following said interval of reduction of power supplied to said controller.

55. The method of claim 54, wherein said distinguishing includes ceasing to identify RF signals as having encoded command signals intended for a controller of said device and beginning to identify RF signals as RF traffic signals intended to be directed to a selected port upon recognizing a sequence of bit values corresponding to a predetermined end-frame command or upon detecting an RF power level of a received RF signal exceeding a predetermined threshold power value.

56. The method of claim 42, further comprising filtering RF signals on said electrically connected RF communication path to substantially block component signals having a frequency below a first predetermined cutoff frequency; filtering RF signals on a bypass path to substantially block component signals having a frequency above a second predetermined cutoff frequency; and recombining component signals of said electrically connected RF communication path and said bypass path to output RF signals at a bypass port.

57. The method of claim 56 wherein at least some of said signals received at a port of said device have a DC component, said method further comprising supplying power to circuitry of said device as a function of said DC component.

58. The method of claim 42 wherein said electrically connected communication path is a bypass path which bypasses circuitry for said decoding and said selected port is a bypass port, wherein said forwarding includes forwarding input traffic signals along said bypass path; and said conveying includes outputting traffic signals at said bypass port wherein circuitry for said decoding is substantially bypassed by an input traffic signal.

59. The method of claim 42 wherein said receiving at a port of said device includes controlling a switch to select said first port from a plurality of ports to input RF signals which include RF traffic signals and command signals encoded in RF signals at said first port and to provide an electrically connected RF communication path for RF traffic signals between said first port and a selected port.

60. A device, comprising:
a plurality of ports adapted to convey traffic signals, wherein at least one of said plurality of ports adapted to convey traffic signals and command signals;
network means including a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch for selectively coupling ports to provide an electrically connected communication path for traffic signals between a pair of ports, wherein at least one port of said pair of ports is adapted to convey traffic signals and command signals; and
controller means for receiving traffic signals and command signals from said at least one of said plurality of ports, and decoding said command signals and controlling said network means to provide said electrically connected communication path between said pair of ports in response to a decoded command signal wherein a traffic signal is directed between said pair of ports via said controller means.

61. The device of claim 60, for use with an RFID transponder wherein said traffic signals are radio frequency identification (RFID) traffic signals, said device further comprising,
antenna means coupled to a selected port for transmitting said RFID traffic signals by at least one of electromagnetic radiation, inductively coupled signal, and capacitively coupled signal to an RFID transponder; and for receiving a response signal from said RFID transponder in response to said transmitted radiation to provide a return traffic signal to said selected port.

62. The device of claim 61, wherein said command signals are encoded in a radio frequency (RF) signal as a function of the RF power level of the RF signal and said controller means comprises means for detecting the power level of a received RF signal.

63. The device of claim 62, wherein said controller means has means for distinguishing, as a function of said detected RF power level of a received RF signal, between command signals intended for said controller means of said device and RF traffic signals intended to be directed on an electrically connected RF communication path between selected ports.

64. The device of claim 63, wherein said distinguishing means identifies command signals encoded in RF signals and intended for said controller of said device when said detected RF power level of a received RF signal is below a predetermined threshold power value, and identifies RF traffic signals intended to be directed on said electrically connected RF communication path between selected ports, when said detected RF power level of a received RF signal exceeds said predetermined threshold power value.

65. The device of claim 60, further comprising a first filter adapted to filter input RF signals on said electrically connected communication path to substantially block component signals having a frequency below a predetermined cutoff frequency; a bypass port, a bypass path coupling said port adapted to convey traffic signals and command signals to said bypass port, a second filter adapted to filter input signals on said bypass path to substantially block component signals having a frequency above a predetermined cutoff frequency; and a summing means for combining component signals of said communication path and said bypass path to output signals at said bypass port.

66. The device of claim 65, wherein at least some of said input signals received at said port adapted to convey traffic signals and command signals have a DC component, said device further comprising power supply means for supplying power for said device as a function of said DC component.

67. The device of claim 60, further comprising a first filter adapted to filter input RF signals on said electrically connected communication path to substantially pass RF signals, traffic signals, and control signals having a frequency at or above a predetermined cutoff frequency and to substantially block component signals having a frequency below said predetermined cutoff frequency; wherein said network means includes a bypass port and means responsive to said controller means for directing a traffic signal from said port adapted to convey traffic signals and command signals to said bypass port and bypassing said first filter.

68. The device of claim 60, further comprising an additional port adapted to convey traffic signals and command signals, wherein said network means further includes input switch means for selectively coupling either said port adapted to convey traffic signals and command signals or said additional port to a selected port to provide an electrically connected communication path for traffic signals between said first or said additional port and said selected port.

69. The device of claim 60, further comprising enclosure means for enclosing each of said means within said enclosure means.

70. The device of claim 60, for use with a network having other elements on said network, and further comprising means responsive to said device being connected to a network, for identifying to another element on the network information including one or more of the device's identity, type, state, data communications capabilities, RF communications capabilities.

71. The device of claim 60 for use with a network having other elements on said network, and further comprising peripheral devices coupled to ports of said device and means responsive to said device being connected to a network, for identifying to another element on the network information including one or more of identity, type, state, data communications capabilities, RF communications capabilities, of one or more of the peripheral devices coupled to said device.

72. A network, comprising:
a first peripheral array having a plurality of ports, at least one of which is a first port adapted to convey traffic signals and command signals, at least one of which is a bypass port adapted to convey traffic signals, and a plurality of which are additional ports adapted to convey traffic signals;
a plurality of peripheral devices coupled to said additional ports, a switch network disposed within said array and having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals between said first port and a selected additional or bypass port;
a controller adapted to receive traffic signals and command signals from said at least one of said plurality of ports, and to decode said command signals and control said switches to provide said electrically connected communication path between said first port and a selected additional or bypass port in response to a decoded command signal wherein a traffic signal is directed from said first port to a peripheral device coupled to a selected additional port and wherein a traffic signal is directed from said first port to said bypass port via said controller;
a second peripheral array having a first port series connected to said bypass port of said first peripheral array, a second plurality of additional ports adapted to convey traffic signals;
a second plurality of peripheral devices coupled to said second plurality of additional ports, a second switch network disposed within said second peripheral array and having a plurality of inverters, switches: and conductive paths, the plurality of inverters, switches, and conductive paths arranged in a cascading configuration, including at least two interconnected layers of the switches, each switch of the second plurality of switches coupled to an inverter of the second plurality of inverters, and each conductive path of the second plurality of conductive paths assigned and coupled to a switch of said plurality of switches, each switch adapted to selectively couple ports of said second peripheral array to provide an electrically connected communication path for traffic signals between said first port of second peripheral array and a selected port of said second plurality of said second peripheral array; and
a second controller adapted to decode command signals and control said switches of said second switch network to provide an electrically connected communication path between said first port of second peripheral array and a selected port of said second plurality of said second peripheral array in response to a decoded command signal wherein a traffic signal may be directed from said first port of second peripheral array to a peripheral device coupled to a selected port of said second plurality of said second peripheral array.

73. A peripheral array, comprising:
a module having a single first port adapted to convey signals which include a radio frequency identification (RFID) traffic signals and RF command signals;
a plurality of additional ports adapted to convey RFID traffic signals; a switch network having a plurality of inverters, switches, and conductive paths, the plurality of inverters, switches and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals from said first port to a selected port of said additional ports;
a controller adapted to receive traffic signals and command signals from said single first port and least one of said plurality of additional ports, and to decode command signals and control said switches to provide said electrically connected communication path between ports in response to a decoded command signal wherein a traffic signal is directed from said first port to a selected port of said additional ports via said controller, and wherein said traffic signal facilitates detection and identification of marked or tagged items;
a plurality of antennas, each antenna being coupled to a port of said additional ports and adapted to transmit said RFID traffic signals by electromagnetic radiation, inductive coupling, and capacitive coupling; and
an enclosure enclosing said switch network, controller and antennas.

74. A device, comprising: a module, wherein the module comprises:
said plurality of ports is adapted to convey traffic signals and command signals;
a switch network having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals between a pair of ports, wherein at least one port of said pair of ports is adapted to convey traffic signals and command signals; and
a controller adapted to receive traffic signals and command signals from said one of said plurality of ports, and to decode command signals and control said switches to provide said electrically connected communication path between said pair of ports in response to a decoded command signal, wherein a traffic signal is conveyed between said pair of ports via said controller.

75. The device of claim 74, wherein the device comprises an RFID reader.

76. A network, comprising:
an array having a plurality of ports, at least one of which is a first port adapted to convey traffic signals and command signals, and a plurality of which are additional ports adapted to convey traffic signals;
a plurality of peripheral devices coupled to said ports, a first switch network disposed within said peripheral array and having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple ports to provide an electrically connected communication path for traffic signals between said first port and a selected port;
a first controller adapted to receive traffic signals and command signals from said first switch network, and to decode said command signals and control said switches to provide said communication path between said first port and a selected port in response to a decoded command signal wherein a traffic signal is directed from said first port to a selected port via said controller;
a network control device having a second plurality of ports, at least one of which is a port series connected to a port of said first peripheral array and adapted to convey traffic signals and command signals, and a plurality of which are ports adapted to convey traffic signals;
a second switch network having a plurality of inverters, switches and conductive paths, the plurality of inverters, switches and conductive paths arranged in a cascading configuration including at least two interconnected layers of the switches, each switch of the second plurality of switches of the second switch network coupled to an inverter of the second plurality of inverters, and each conductive path of the second plurality of conductive paths assigned and coupled to a switch of said second plurality of switches, each switch adapted to selectively couple ports to provide an electrically connected communication path for traffic signals from a port coupled with first peripheral array to a selected port of said second plurality of ports; and
a second controller adapted to decode command signals and control said switches of said second switch network to provide said communication path between ports in response to a decoded command signal wherein a traffic signal may be directed from a port coupled with first peripheral array to said selected port of said second plurality of ports.

77. The network of claim 76, wherein said network control device comprises a first network control device and further comprising:
one or more additional network control devices, each having a respective port adapted to convey traffic signals and command signals, said port series connected to a selected port of one of said peripheral array, network control device, and another of said one or more additional network control devices.

78. The network of claim 76, wherein said selected port comprises a bypass port.

79. The device of claim 1, wherein at least one of the plurality of switches of the switch network is a two-input, two-output switch.

80. The network of claim 33, wherein at least one of the plurality of switches of the first switch network is a two-input, two-output switch and at least one of the plurality of switches of the second switch network is a two-input, two-output switch.

81. The device of claim 60, wherein at least one of the plurality of switches of the switch network is a two-input, two-output switch.

82. The network of claim 72, wherein at least one of the plurality of switches of the first switch network is a two-input, two-output switch and at least one of the plurality of switches of the second switch network is a two-input, two-output switch.

83. The peripheral array of claim 73, wherein at least one of the plurality of switches of the switch network is a two-input, two-output switch.

84. The network of claim 76, wherein at least one of the plurality of switches of the first switch network is a two-input, two-output switch and at least one of the plurality of switches of the second switch network is a two-input, two-output switch.

* * * * *